US010821434B2

(12) United States Patent
Cote

(10) Patent No.: US 10,821,434 B2
(45) Date of Patent: Nov. 3, 2020

(54) MULTICHANNEL AIR DISPLACEMENT PIPETTOR

(71) Applicant: Avidien Technologies, Inc., Bolton, MA (US)

(72) Inventor: Richard Cote, Bolton, MA (US)

(73) Assignee: AVIDIEN TECHNOLOGIES, INC., Hudson, MA (US)

( * ) Notice: Subject to any disclaimer, the term of this patent is extended or adjusted under 35 U.S.C. 154(b) by 502 days.

(21) Appl. No.: 15/527,419

(22) PCT Filed: Nov. 18, 2015

(86) PCT No.: PCT/US2015/061329
§ 371 (c)(1),
(2) Date: May 17, 2017

(87) PCT Pub. No.: WO2016/081595
PCT Pub. Date: May 26, 2016

(65) Prior Publication Data
US 2017/0354965 A1    Dec. 14, 2017

Related U.S. Application Data

(60) Provisional application No. 62/081,202, filed on Nov. 18, 2014.

(51) Int. Cl.
*B01L 3/02* (2006.01)
*G01N 35/10* (2006.01)

(52) U.S. Cl.
CPC .......... *B01L 3/0217* (2013.01); *B01L 3/0227* (2013.01); *B01L 2200/0689* (2013.01);
(Continued)

(58) Field of Classification Search
None
See application file for complete search history.

(56) References Cited

U.S. PATENT DOCUMENTS 3,327,535 A * 6/1967 Sequeira ................. B01L 3/021
141/130
3,683,977 A * 8/1972 Crowe ..................... G01N 1/18
141/130
(Continued)

FOREIGN PATENT DOCUMENTS

WO    WO 2011/007194 A1    1/2011
WO    WO 2013/012588 A1    1/2013
(Continued)

OTHER PUBLICATIONS

International Preliminary Report on Patentability issued by International Bureau of WIPO in related International Patent Application No. PCT/US2015/061329 dated Jun. 1, 2017.
(Continued)

*Primary Examiner* — Jill A Warden
*Assistant Examiner* — Brittany I Fisher
(74) *Attorney, Agent, or Firm* — Grant IP, Inc.

(57) ABSTRACT

A pipetting system is disclosed that includes a pipette head including a multichannel air displacement system for aspirating and dispensing liquids, a pipetting system base that includes a linear guide system along which the pipette head may be moved vertically with respect to the pipetting system base, and counterbalance means for counterbalancing at least a portion of a weight of the pipette head.

21 Claims, 35 Drawing Sheets

(52) U.S. Cl.
CPC ............... *B01L 2300/0829* (2013.01); *B01L 2300/0861* (2013.01); *B01L 2400/0478* (2013.01); *B01L 2400/0622* (2013.01); *B01L 2400/0666* (2013.01); *G01N 35/1011* (2013.01); *G01N 35/1065* (2013.01)

(56) References Cited

U.S. PATENT DOCUMENTS

| | | | |
|---|---|---|---|
| 3,778,351 A | | 12/1973 | Rosov |
| 3,991,616 A | * | 11/1976 | Stahli .................... B01L 3/0227 73/863.32 |
| 4,215,092 A | | 7/1980 | Suovaniemi et al. |
| 4,237,095 A | | 12/1980 | Suovaniemi et al. |
| 4,734,261 A | * | 3/1988 | Koizumi ............... B01L 3/0217 141/243 |
| 6,143,252 A | * | 11/2000 | Haxo, Jr. ............. B01J 19/0046 422/131 |
| 6,159,368 A | | 12/2000 | Moring et al. |
| 6,923,938 B2 | * | 8/2005 | Cote .................... B01L 3/0224 422/525 |
| 6,982,063 B2 | * | 1/2006 | Hamel ................. G01N 35/028 422/511 |
| 7,335,337 B1 | | 2/2008 | Smith |
| 8,485,357 B2 | | 7/2013 | Song et al. |
| 8,591,832 B2 | * | 11/2013 | Nelson ............... G01N 35/0099 422/509 |
| 2002/0086440 A1 | | 7/2002 | Lehtinen et al. |
| 2002/0125197 A1 | | 9/2002 | Hager et al. |
| 2002/0146353 A1 | * | 10/2002 | Bevirt .................. B01L 3/0227 422/501 |
| 2004/0071602 A1 | | 4/2004 | Yiu |
| 2004/0231438 A1 | | 11/2004 | Schwartz |
| 2007/0048188 A1 | | 3/2007 | Bigus |
| 2007/0221684 A1 | * | 9/2007 | Steinbrenner ............. B01L 3/02 222/267 |
| 2009/0129985 A1 | * | 5/2009 | Ikushima ........... G01N 35/1074 422/400 |
| 2010/0252579 A1 | | 10/2010 | Steinbrenner et al. |
| 2011/0268628 A1 | | 11/2011 | Warhurst et al. |
| 2012/0258026 A1 | | 10/2012 | Naumann |
| 2013/0047751 A1 | | 2/2013 | Voss et al. |
| 2013/0078624 A1 | * | 3/2013 | Holmes .................... C12Q 1/00 435/6.11 |
| 2018/0117584 A1 | | 5/2018 | Cote |

FOREIGN PATENT DOCUMENTS

| | | |
|---|---|---|
| WO | WO 2013/181163 A1 | 12/2013 |
| WO | WO 2016/081595 A1 | 5/2016 |
| WO | WO 2016/094553 A1 | 6/2016 |

OTHER PUBLICATIONS

Communication Pursuant to Rules 161(2) and 162 by the European Patent Office dated Jun. 27, 2017 in related European Patent Application No. 15861977.5-1371.

"Extended European Search Report dated Aug. 16, 2018 in Europe Patent Application No. 15861977.5, filed on Nov. 18, 2015", 11 pages.

"Extended European Search Report dated Sep. 20, 2018 in Europe Patent Application No. 18184263.4, filed on Jul. 18, 2018", 6 pages.

"International Preliminary Report on Patentability dated Jan. 30, 2014 in International Patent Application No. PCT/US2012/045925, filed on Jul. 9, 2012", 8 pages.

"International Search Report and Written Opinion dated Dec. 7, 2012 in International Patent Application No. PCT/US2012/045925, filed on Jul. 9, 2012", 9 pages.

"International Search Report and Written Opinion dated Jan. 29, 2016 in International Patent Application No. PCT/US2015/061329, filed on Nov. 18, 2015", 10 pages.

"Office Action dated Apr. 6, 2018 in U.S. Appl. No. 14/131,278, filed Apr. 29, 2014 and published as US 2018-0117584 on May 3, 2018", 6 pages.

"Office Action dated Aug. 27, 2018 in U.S. Appl. No. 14/131,278, filed Apr. 29, 2014 and published as US 2018-0117584 on May 3, 2018", 10 pages.

"Office Action dated Feb. 4, 2019 in U.S. Appl. No. 14/131,278, filed Apr. 29, 2014 and published as US 2018-0117584 on May 3, 2018", 11 pages.

"Office Action dated Jan. 7, 2020 in U.S. Appl. No. 14/131,278, filed Apr. 29, 2014 and published as US 2018-0117584 on May 3, 2018", 11 pages.

"Office Action dated Jul. 15, 2019 in U.S. Appl. No. 14/131,278, filed Apr. 29, 2014 and published as US 2018-0117584 on May 3, 2018", 9 pages.

* cited by examiner

MULTICHANNEL AIR DISPLACEMENT PIPETTOR

PRIORITY

The present application claims priority to PCT Application Ser. No. PCT/US2015/061329 filed Nov. 18, 2015, that claims priority to U.S. Provisional Patent Application Ser. No. 62/081,202 filed Nov. 18, 2014, both of which are the disclosure of which is incorporated herein by reference in its entirety their entireties.

FIELD

Embodiments of the present invention relate generally to multichannel air displacement pipettors, and are concerned in particular with the provision of a pipettor having a compact design made possible in large part by a novel drive system and a reduced force required to detachably connect pipette tips.

BACKGROUND

Air displacement pipettors are typically used to transfer liquids between vessels as part of an assay. Common vessels are microtiter plates, test tubes and reservoirs.

Air displacement pipettors frequently make use of a piston and cylinder arrangement, which is used to create positive and negative pressure in an attached pipette tip. When the open end of the tip is placed into a liquid, the change in pressure causes the liquid to be aspirated into, or dispensed from, the interior of the pipette tip.

In conventional air displacement pipettors, linear positioning and electronic control systems are employed to precisely vary the axial position of the pistons in order to provide extremely accurate uptake and dispensing of pipetted liquids. This approach has been deployed in instruments of the prior art by utilizing a motor that is fixed relative to the movement of the pistons. Typically, the motor is a servo motor or stepper motor with a rotating shaft that can be precisely controlled for angular position and velocity. This precise, controllable rotation is typically converted to precision linear movement through a power screw and engaged nut arrangement. The fixed motor, usually through a transmission means such as a belt and cogged pulleys, turns two or more axially fixed drive screws. An equal number of nuts are engaged with the power screws and are fixed to a plate, which in turn drives the position of the pistons. These systems are relatively bulky and require space and components to accommodate the transmission of power from the fixed motor to the movable piston drive plate. Additionally these systems are bulky because the drive screws and nuts are outside the perimeter of the 8×12 array of pistons.

SUMMARY

In accordance with an embodiment, the invention provides a pipetting system that includes a pipette head including a multichannel air displacement system for aspirating and dispensing liquids, a pipetting system base that includes a linear guide system along which the pipette head may be moved vertically with respect to the pipetting system base, and counterbalance means for counterbalancing at least a portion of a weight of the pipette head.

In accordance with another embodiment, the invention provides a pipetting system that includes a pipette head including a multichannel air displacement system for aspirating and dispensing liquids, a pipetting system base that includes a linear guide system along which the pipette head may be moved vertically with respect to the pipetting system base, manual adjustment means that permits a user to easily move the pipette head with respect to the pipetting system base, and a multichannel air displacement system on the pipette head, wherein the multichannel air displacement system includes a displacement motor for reciprocally moving pistons is respective cylinders responsive to motor drive commands In accordance with a further embodiment, the invention provides a pipetting system that includes a pipette head including a multichannel air displacement system that includes a plurality of pistons for simultaneously aspirating liquids into a plurality of pipette tips, wherein the pipette head includes a set of valves, each of which is associated with a pipette location and is connected to an air bleed port, and wherein each of the sets of valves is independently controllable to control the volume of liquid that may be aspirated into each pipette tip.

BRIEF DESCRIPTION OF THE DRAWINGS

The following description may be further understood with reference to the accompanying drawings in which.

DETAILED DESCRIPTION

Broadly stated, embodiments of the present invention address the above described shortcomings of the prior art by providing a multichannel air displacement pipettor with a compact design made possible in part by a novel drive system for advancing and retracting the pistons in their respective cylinders.

Other novel features of the present invention include an improved tip sealing and ejection arrangement designed to work in conjunction with a tip adapter of the type disclosed in Patent Cooperation Treaty Patent Application Publication No. WO 2013/012588 A1, the description of which is herein incorporated by reference in its entirety.

These and other features and attendant advantages of the present invention will now be described in further detail with reference to the accompanying drawings.

Figure 1:
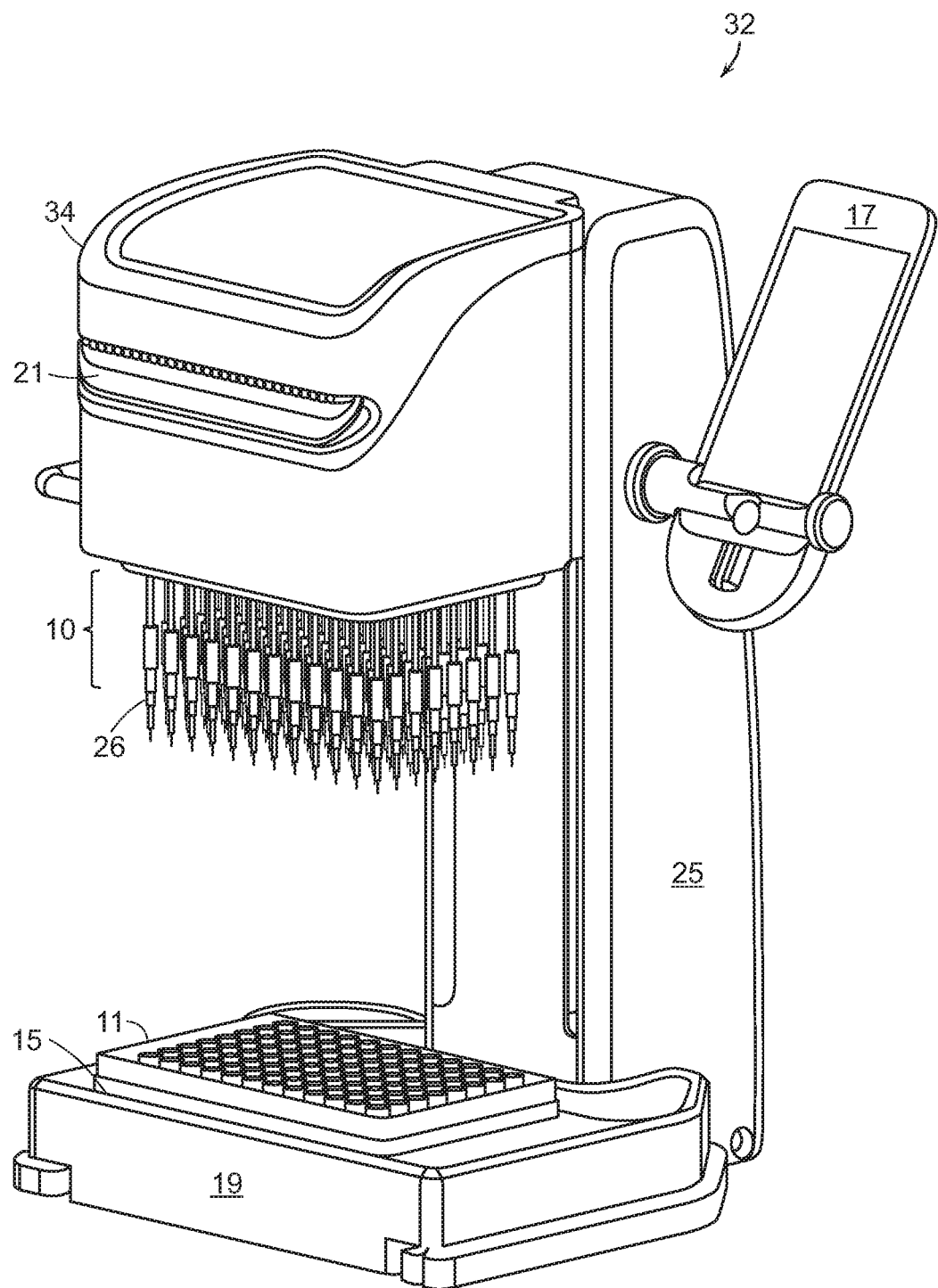
FIG. 1 shows an illustrative diagrammatic isometric view of an air displacement pipettor in accordance with an embodiment of the present invention.
Figure 2:
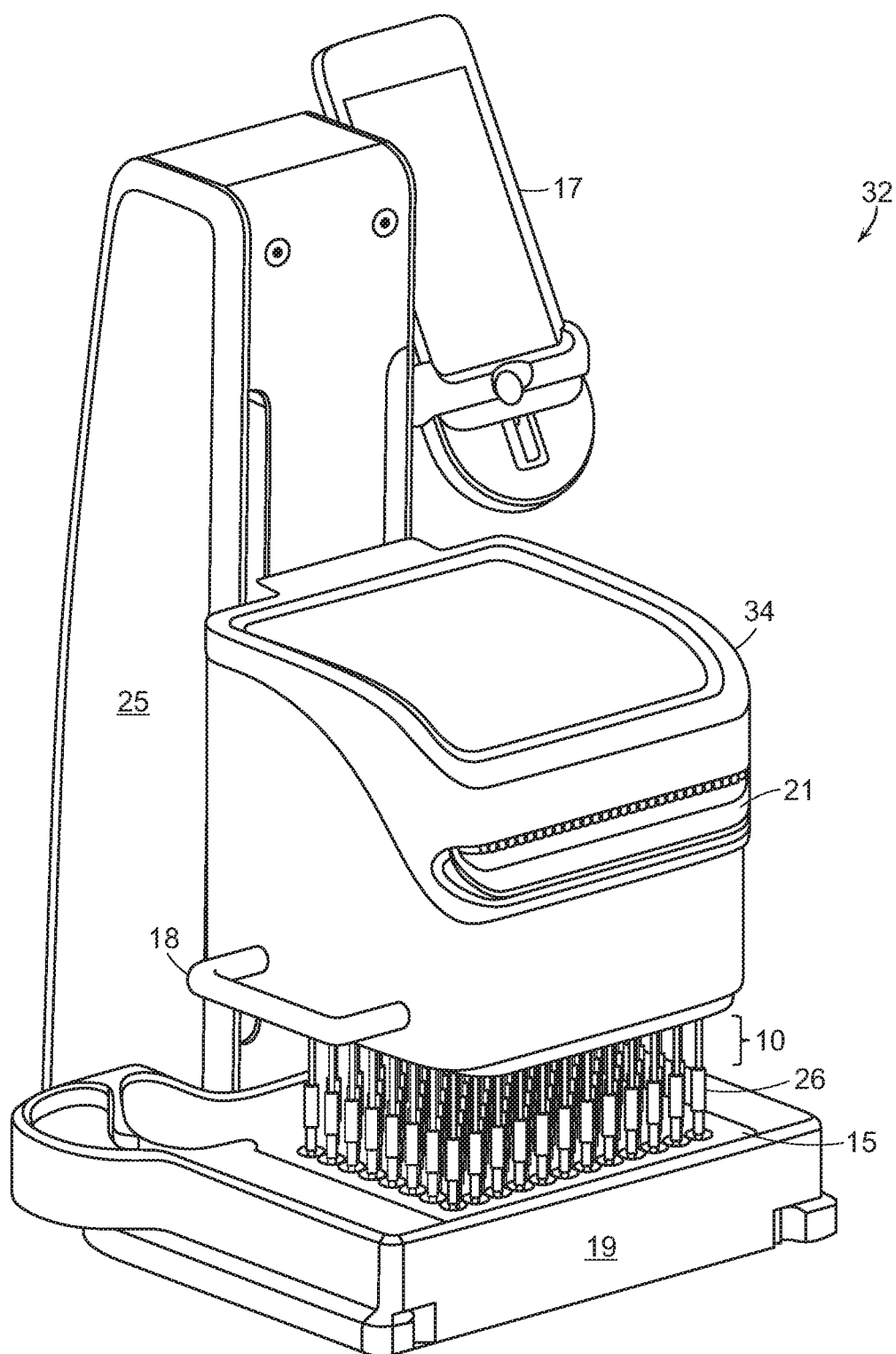
FIG. 2 shows an illustrative diagrammatic isometric view of the air displacement pipettor of FIG. 1 with the pipette head lowered.
Figure 3:
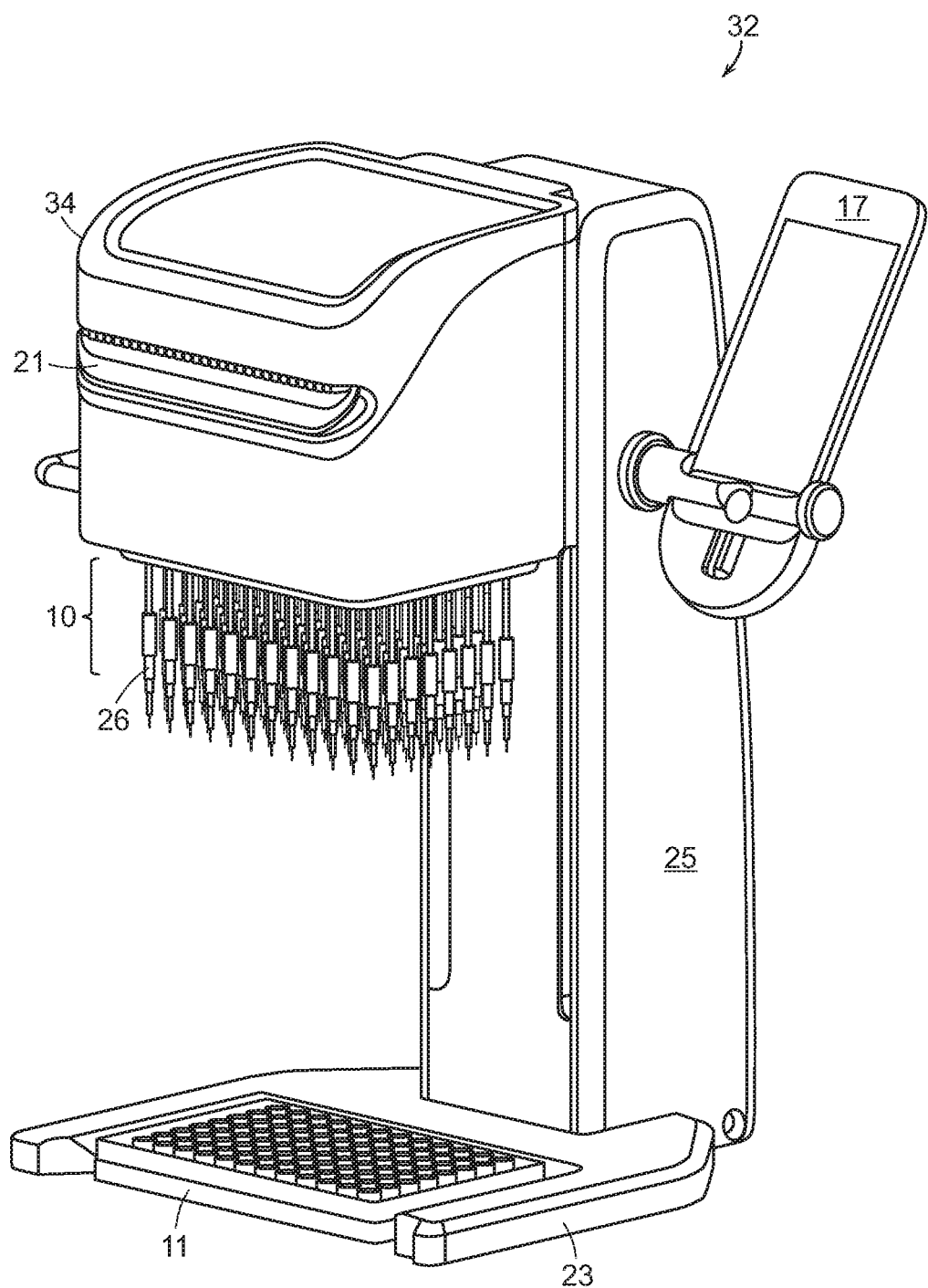
FIG. 3 shows an illustrative diagrammatic view of the air displacement pipettor of FIG. 1 without using a liquid reservoir.

An isometric view of the multichannel air displacement pipettor (32), the subject of the present invention, can be seen in FIGS. 1, 2 and 3. The instrument outwardly consists of a pipetting head (34) to which a pipette tip adapter assembly (10) is affixed as the disposable interface between the instrument and the liquid being transferred. The adapter assembly (10) may have, for example, 96 pipette tips (26) affixed in a 12×8 array with 9 mm centerline spacing, matching the well positions of a standard 96 well microtiter plate (11) and other common disposable and reusable labware.

The microtiter plate is positioned in a nest (15) which aligns the wells under the corresponding pipette tips (26). In this embodiment, the nest (15) may comprise a liquid reservoir (19) which is positioned so that liquid can be pipetted from underneath the nest and which provides for convenient filling of microtiter plates (11), for example, with a common reagent liquid. The reservoir (19) is an optional feature of the instrument and FIG. 3 shows an alternate embodiment with the reservoir removed. In this embodiment, the base (23) of the pipettor (32) has the nest built into it and is configured to locate the wells of the microtiter plate (11) precisely under the pipette tips (26) of the adapter assembly (10).

As can be seen in FIGS. 1, 2 and 3, the pipetting head (34) is mounted to the base tower (25) of the instrument, which supports a vertical, precision guide rail that allows the operator to move the head upward and downward to bring the pipette tips (26) into and out of contact with the liquid in the aligned wells of the microtiter plate (11), reservoir (19) or other suitable liquid holding vessel. FIGS. 1 and 3 show the pipetting head in its raised position, and FIG. 2 shows the head in its lowered positions. A counterbalance mechanism offsets the weight of the head so that upon release of the handle (18), the pipetting head (34) maintains the last position in which it was released. A remote computer system (17) such as an Apple iPod is shown as the primary user interface through which a user programs and operates the instrument. An additional pipetting button (21) is provided for advancing through the pipetting steps programmed through the user interface (17). The remote computer system (17) communicates with a controller processor board (30) discussed below with reference to FIG. 5.

Figure 4:
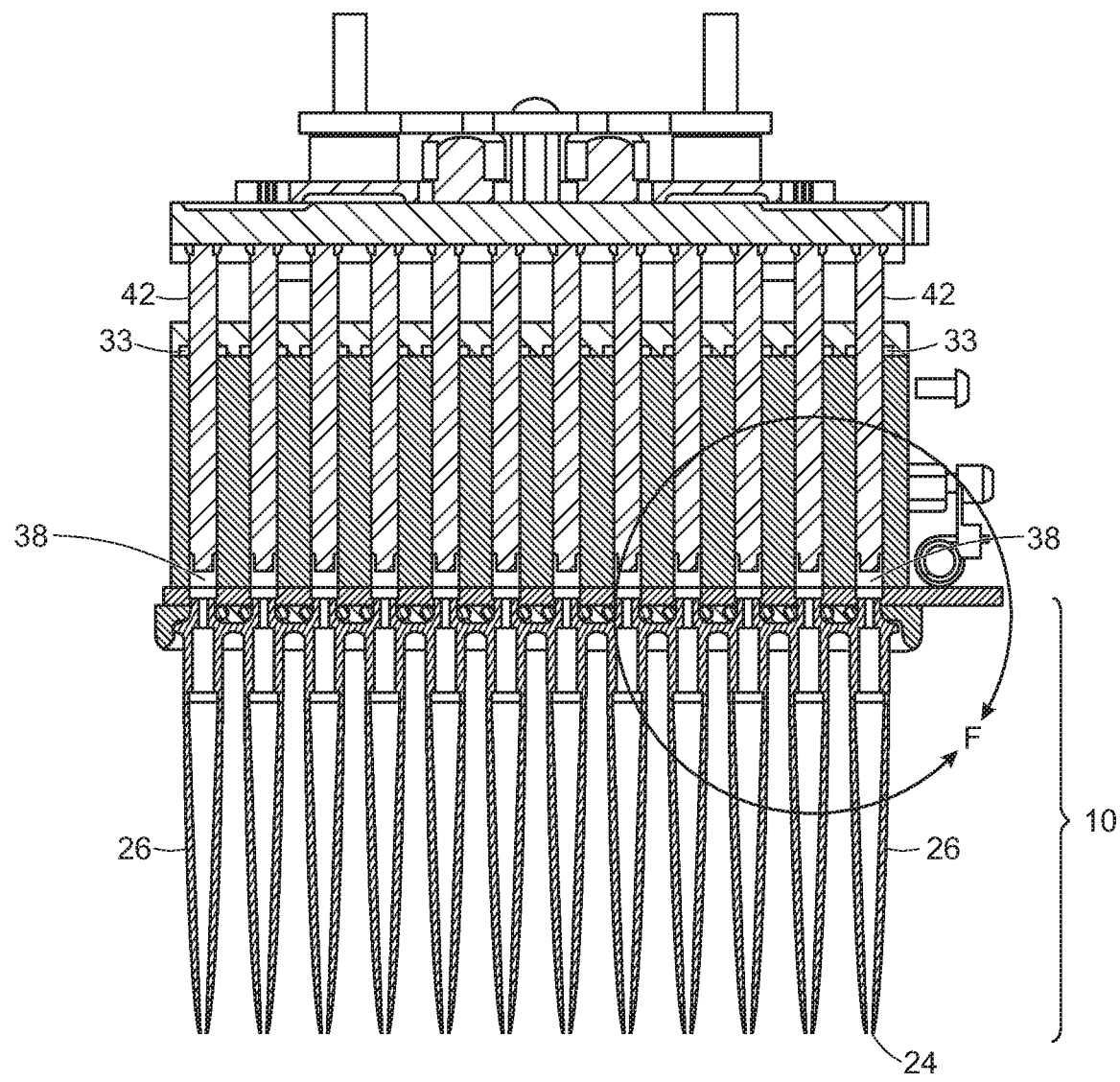
FIG. 4 shows an illustrative diagrammatic sectional view of a pipette head including attached pipette tips in the air displacement pipettor of FIG. 1.

The pipettor (32) accomplishes pipetting through air displacement. As can be seen in FIG. 4, a multitude of individual pistons (42) pass through piston seals (33), which form an airtight seal between the pistons and the associated cylinders (38). The cylinders (38) are in turn sealed to the disposable pipette tips (26) through the adapter assembly (10). It is only the pipette tips (26) that come into contact with the liquid sample, avoiding cross contamination of the instrument. In the same manner as a syringe, axial displacement of the pistons (42) within the cylinders (38) causes a decrease or increase in air pressure which either draws liquid into or drives liquid out of the pipette tips (26).

Figure 5:
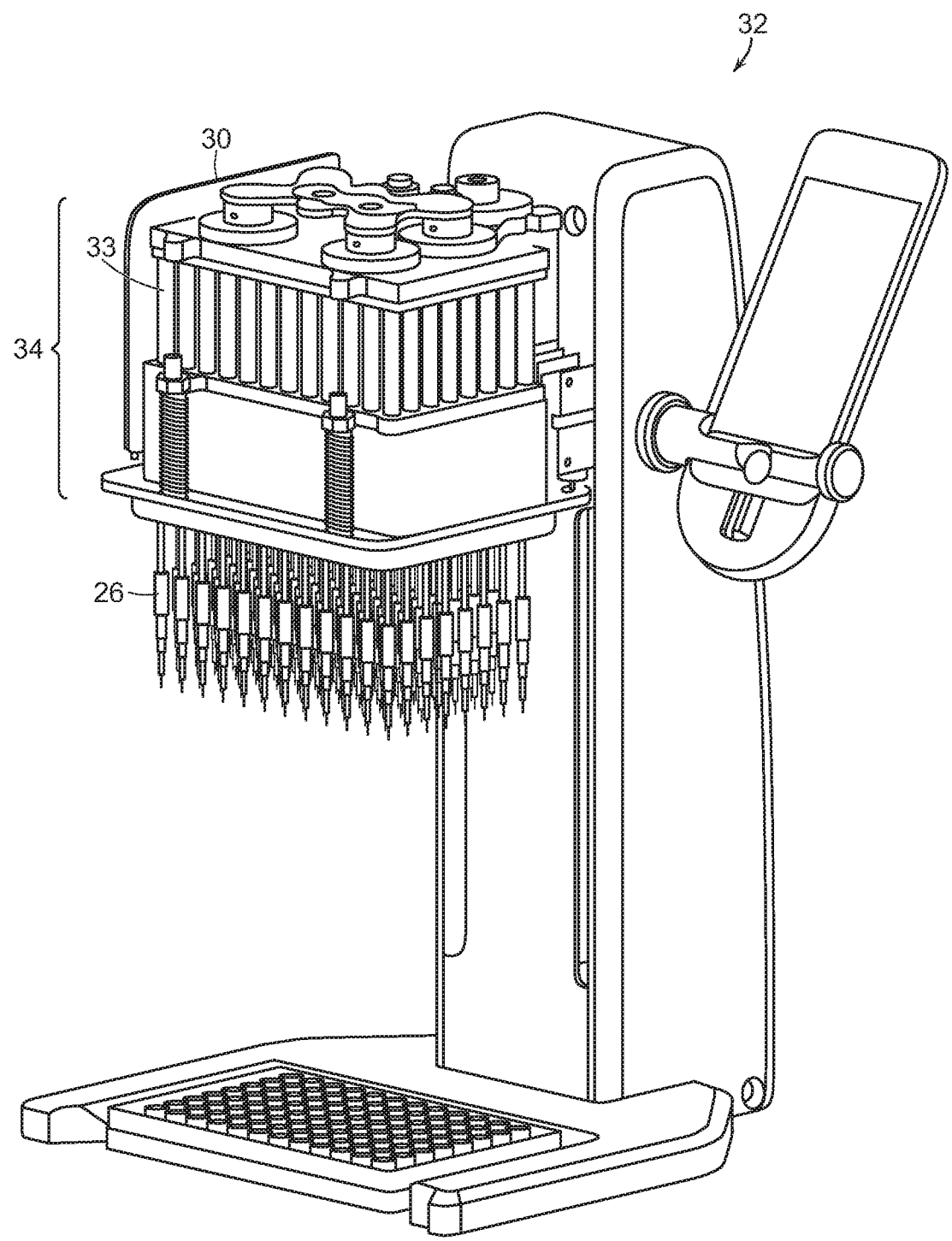
FIG. 5 shows an illustrative diagrammatic isometric view of the air displacement pipettor of FIG. 1 with a cosmetic cover over the pipette head removed.
Figure 6:
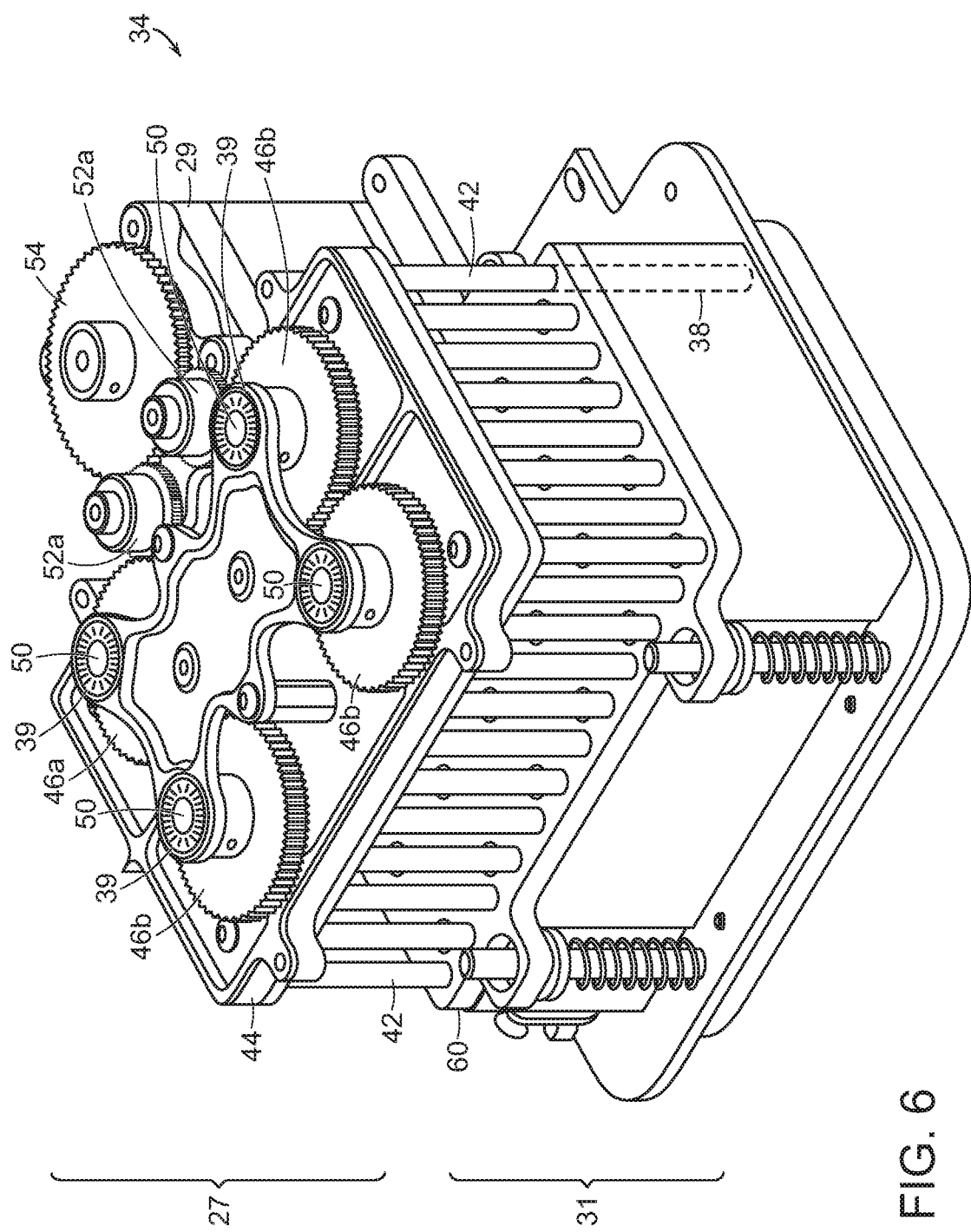
FIG. 6 shows an illustrative diagrammatic isometric view of the pipette head without the cover of the air displacement pipettor of FIG. 1.
Figure 7:
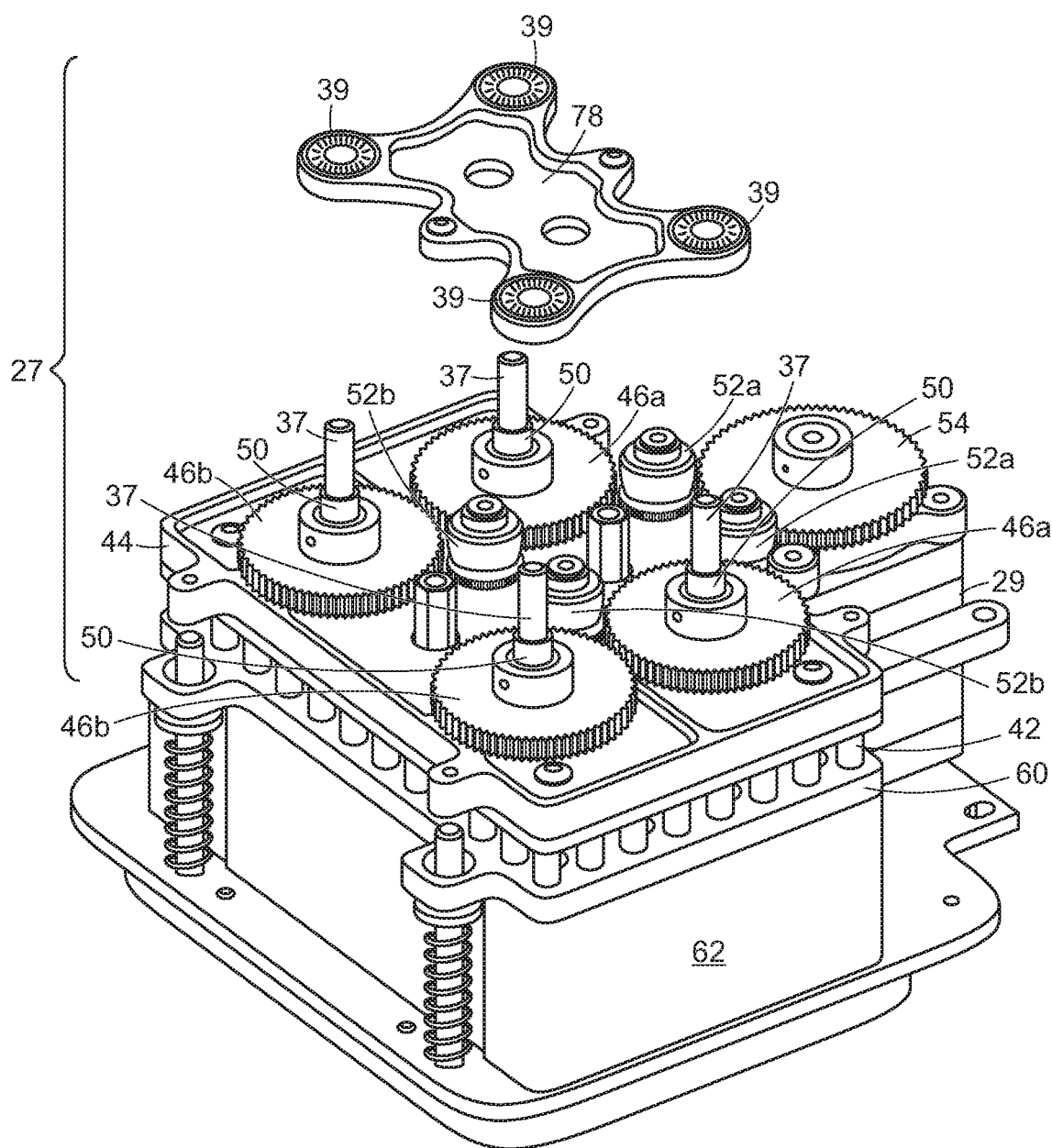
FIG. 7 shows an illustrative diagrammatic isometric view of a portion of the pipette head with the upper bearing plate removed.
Figure 8:
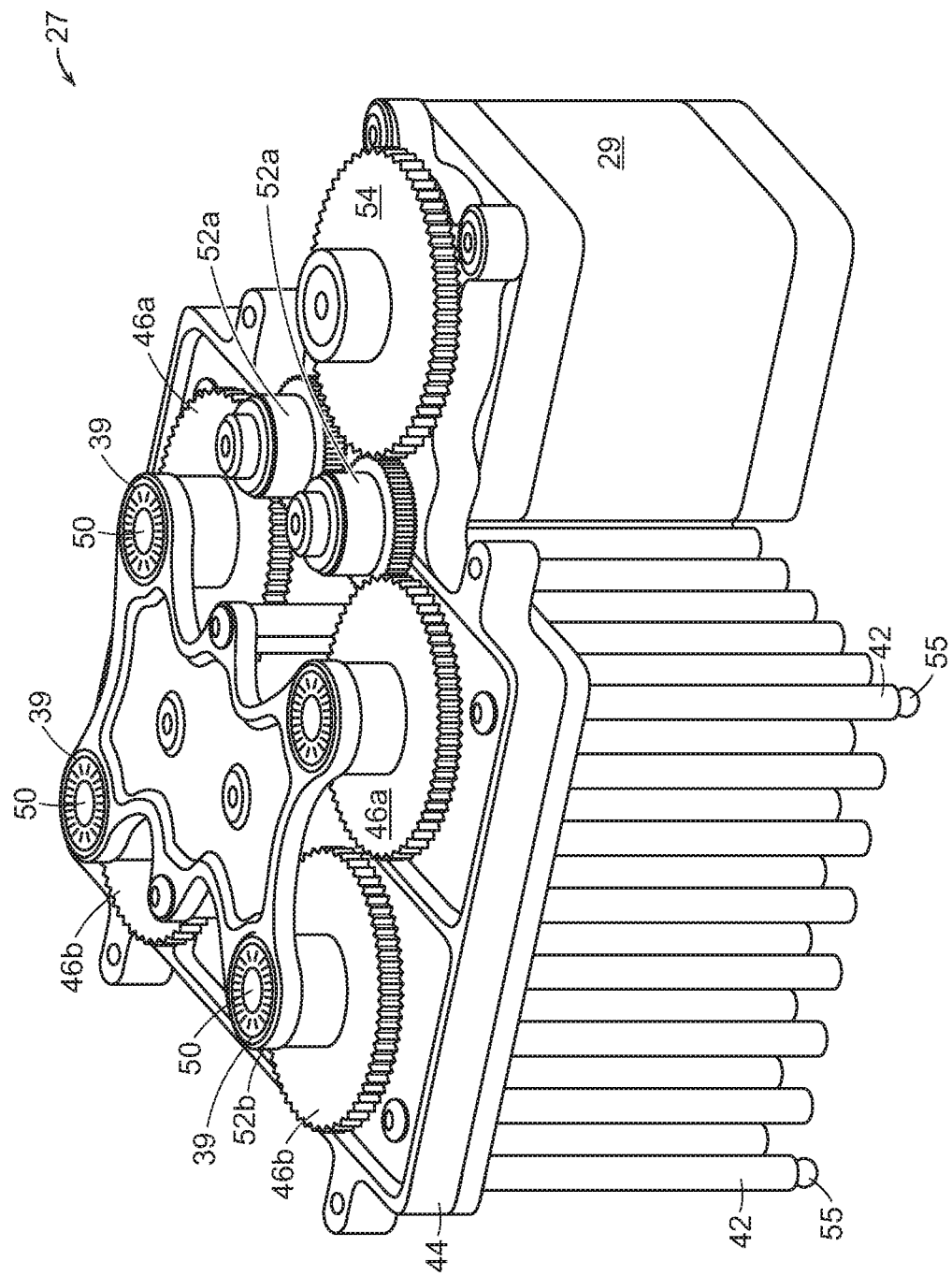
FIG. 8 shows an illustrative diagrammatic isometric rear view of a portion of the pipette head.
Figure 9:
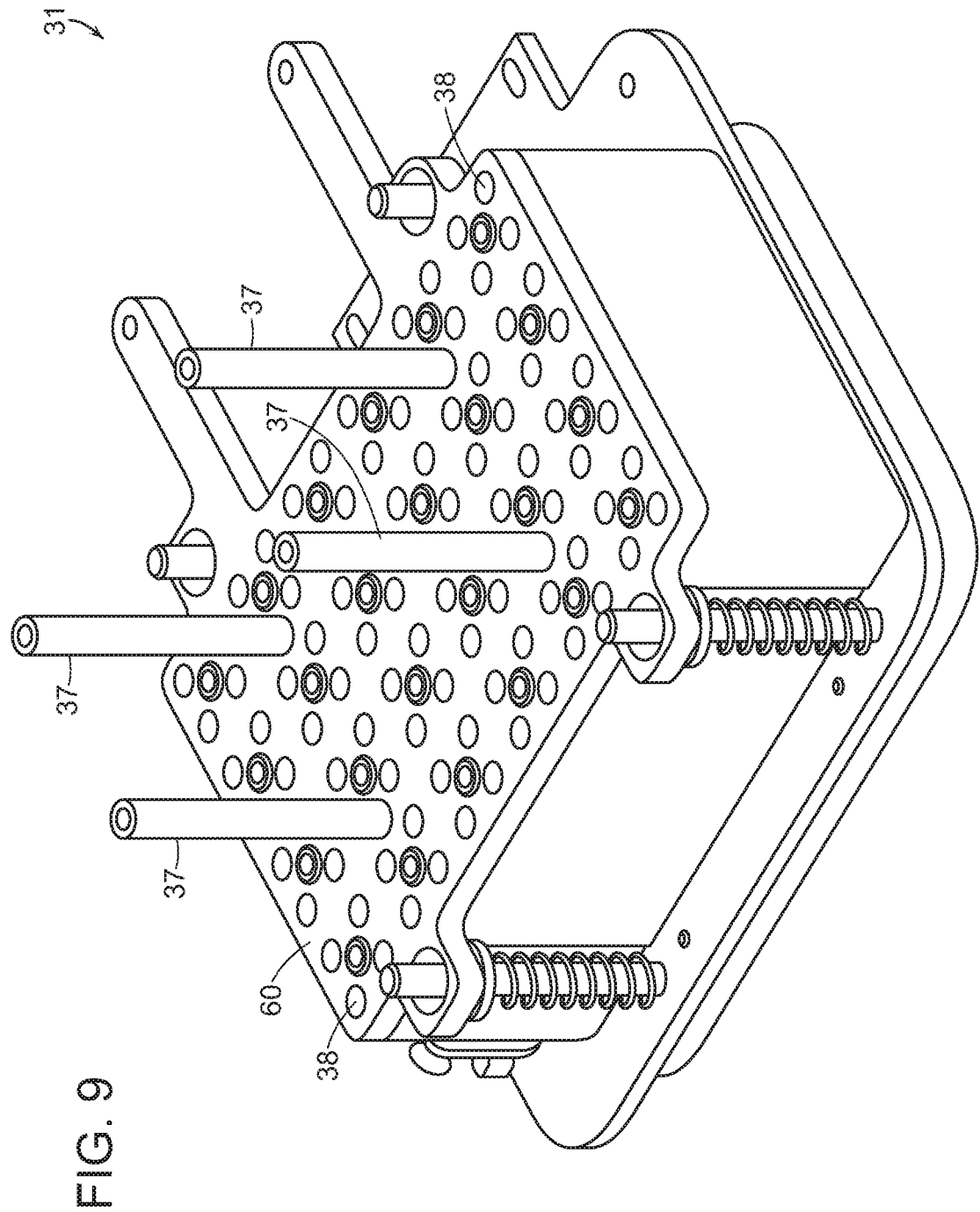
FIG. 9 shows an illustrative diagrammatic isometric view of the cylinder block assembly of the pipette head of FIG. 6.

FIG. 5 shows the pipettor (32) with the cosmetic head cover removed. The pipetting head (34) and its components are exposed in this view and their relationship to the rest of the pipettor (32) can be seen. FIGS. 6 and 7 are detailed views of the pipetting head (34) of the present invention. As shown in FIGS. 8 and 9, the pipetting head has two major assemblies; the movable piston drive assembly (27) and the relatively fixed cylinder block assembly (31). An innovative feature of the pipettor can be seen clearly in FIG. 8. The air displacement motor (29), which drives the pistons (42) in their respective cylinders (38), is mounted to the piston drive plate (44) and moves with the pistons, thus eliminating many of the bulky and heavy components associated with the prior art. The air displacement motor is responsive to air displacement motor commands from the remote controller (17) in wireless communication with the controller processor board (30) shown in FIG. 5. The controller processor board (30) is in direct wired communication with the air displacement motor (29).

Power transmission is achieved through the use of gears (46, 52 and 54), which are also affixed to the piston drive plate (44), are engaged with each other, and are free to spin. A motor gear (54) is directly mounted to, and rotates with, the motor (29), which in turn drives a first pair of idler gears (52a). The first pair of idler gears (52a) is engaged with a first pair of nut drive gears (46a), which are each fixed to a positioning nut drive (50). Each drive nut (50) and its respective drive gear (46) are coaxial and fixed to each other so that they rotate together. A second pair of idler gears (52b) having teeth engaged to the first pair of nut drive gears (46a) (seen in FIG. 7) in turn drive a second set of nut drive gears (46b). In this arrangement, the four gears (46a and 46b), which drive their respective positioning nuts (50), always move together at the same speed and in the direction.

The drive nuts (50) are engaged to four fixed jacking screws (37), which have mating male threads (28) engaged to the female threads of the drive nuts (50). The jacking screws are permanently fixed in the piston seal plate (60) and do not rotate. The result of this configuration is a very compact drive system which precisely converts the radial position of the stepper motor (29) into accurate linear positioning of the piston drive assembly (27), and therefore the axial position of the pistons (42) within their respective cylinders (38).

The variety of gear options provides for a great deal of flexibility in the layout and packaging of this design. A variety of combinations of gears is possible which in turn allows optimization of the gear ratios between the motor (29) and drive nuts (50). Four drive nuts (50) and jacking screws (37) have been selected for this design, but it should be appreciated that a greater or lesser number of drive nuts (50) and fixed jacking screws (37) are also possible. The choice of pitch and geometry of the mating threads of the drive nuts (50) and fixed jacking screws (37) can also be varied to optimize the design.

The invention therefore provides, in accordance with an embodiment, pipetting system that includes a pipette head including a multichannel air displacement system for aspirating and dispensing liquids, a pipetting system base that includes a linear guide system along which the pipette head may be moved vertically with respect to the pipetting system base, manual adjustment means that permits a user to easily move the pipette head with respect to the pipetting system base, and a multichannel air displacement system on the pipette head, wherein the multichannel air displacement system includes a displacement motor for reciprocally moving pistons is respective cylinders responsive to motor drive commands.

Figure 10:
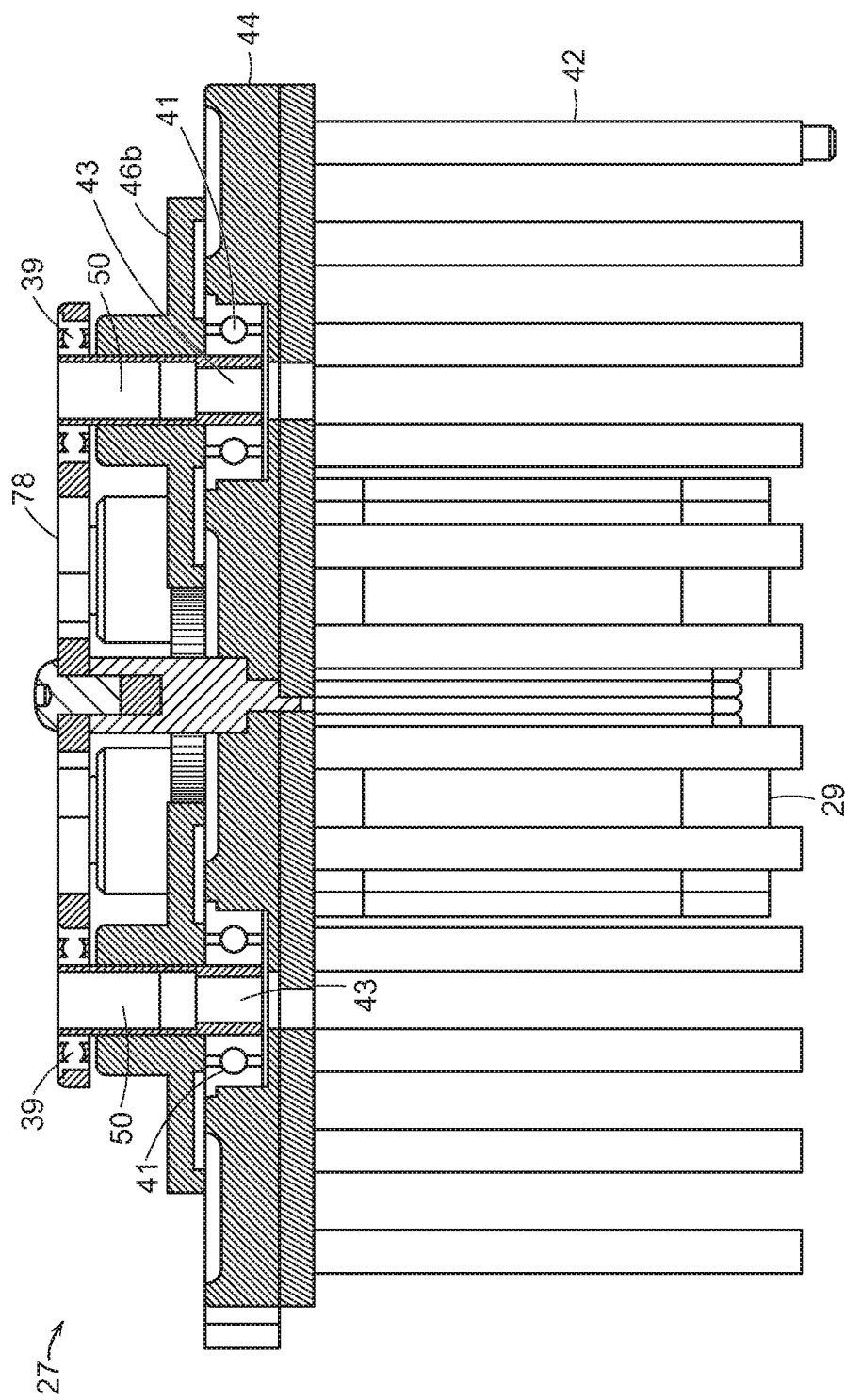
FIG. 10 shows an illustrative side sectional view of the movable piston drive assembly of the pipette head of FIG. 6.

In accordance with further embodiments, the multichannel air displacement system aspirates and dispenses liquids responsive to displacement motor commands, the linear actuator motor system reciprocally moves the repositionable shaft responsive to linear actuator commands, and the linear actuator commands and the displacement motor commands are provided by a control system FIG. 10 is a sectional view of the piston drive assembly (27) through the pair of drive nuts (50). In order to precisely convert the rotary motion of the motor into linear motion, the drive nuts (50) are supported top and bottom with precision bearings (39 and 41). The threaded section (43) of the nut can be seen in this view. This threaded section (43) engages the matching male threads of the fixed jacking screws (37). The upper bearings (39) are mounted in an upper bearing plate (78), which precisely locates and rigidly fixes the bearings. Lower bearings (41) are mounted in the piston drive plate (44), which rigidly fixes and positions them. These bearings provide resistance to axial play resulting from the axial thrust that occurs during movement of the pistons (42) and piston drive plate (44). The bearings also provide positioning and stability to the gears (46a and 46b) to ensure proper meshing of the teeth and smooth, long lasting operation.

In this design, the fixed jacking screws (37) are positioned within the perimeter of the piston drive plate for compactness. Alternatively, the jacking screws (37) could be positioned outside the perimeter of the piston drive plate (44), as might be preferred in a higher density multichannel pipetting system such as a 384 channel pipettors. In a 384 channel pipettors, the channel-to-channel spacing is only 4.5 mm, or half that of the current design. It should also be noted that this preferred configuration in which the rotating drive nuts (50) are mounted on the piston drive plate (44) and threaded to fixed jacking screws (37) mounted to the piston seal plate (60) can be reversed so that the drive screws are mounted coaxially with the gears (42) and rotate, and are engaged with threads that are fixed in the piston seal plate (60) or cylinder block (62). A different type of drive motor, such as an encoded servomotor, can also be used in place of the stepper motor (29).

Figure 11:
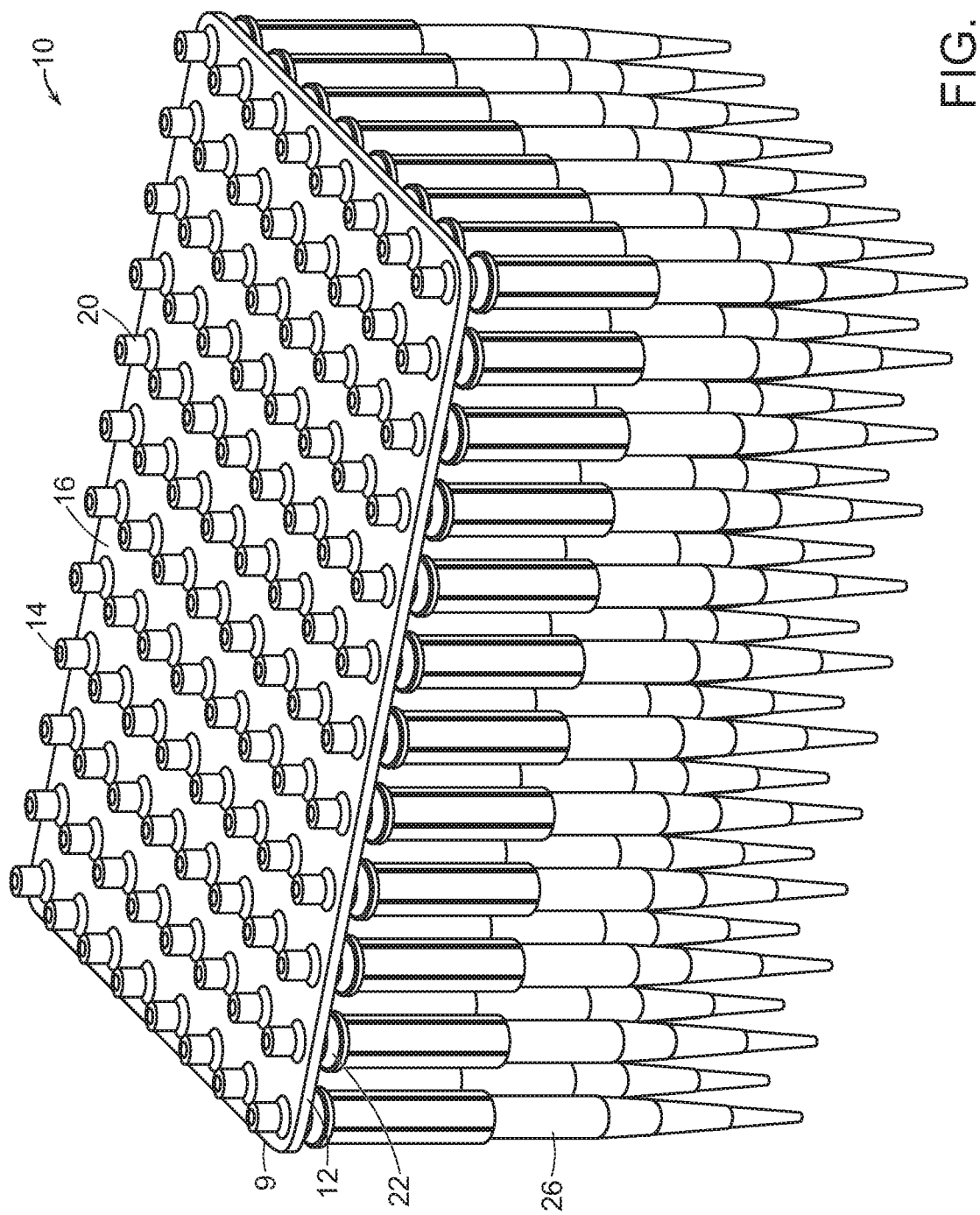
FIG. 11 shows an illustrative isometric view of pipette tip adaptor assembly for use with the air displacement pipettor of FIG. 1.
Figure 12:
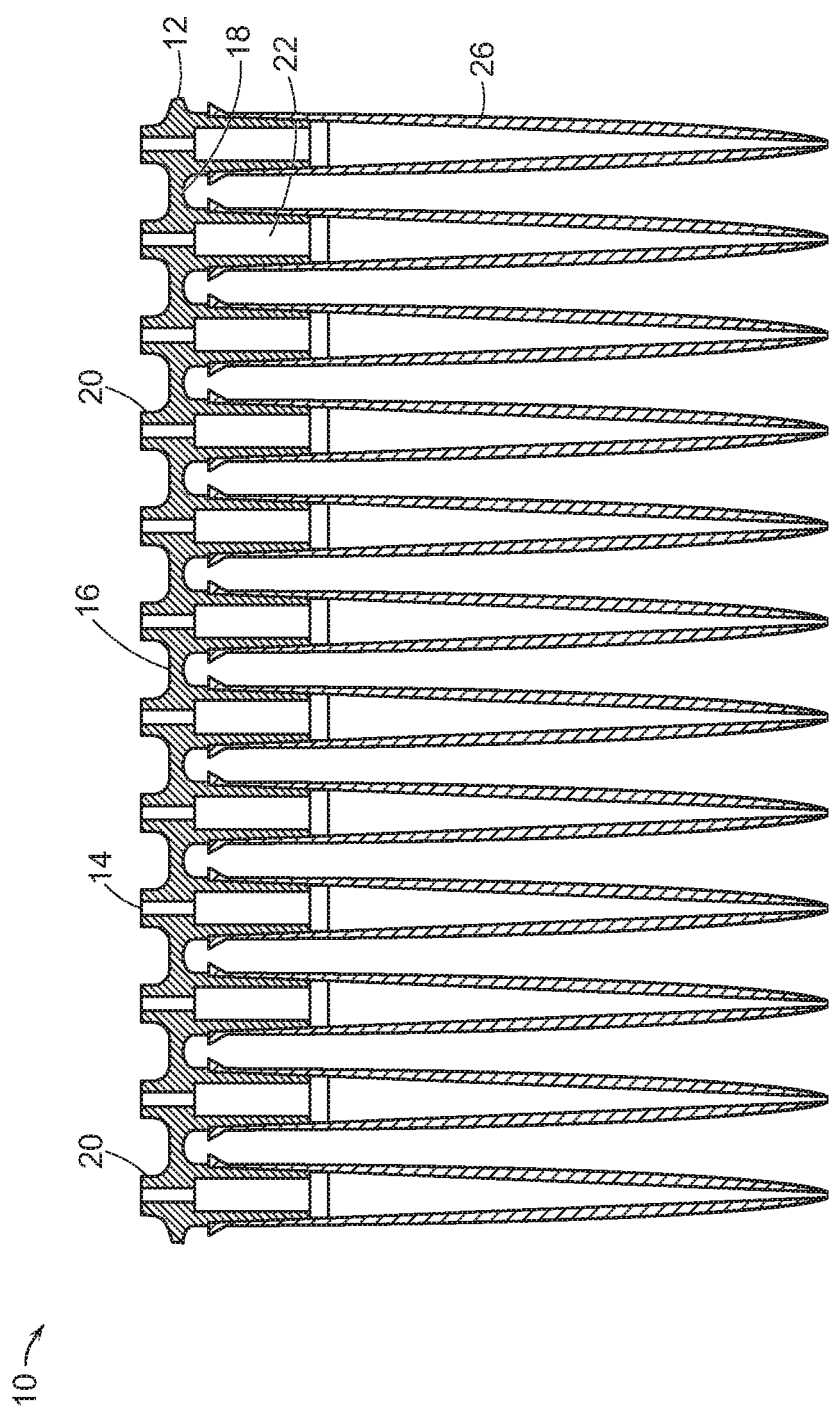
FIG. 12 shows an illustrative side sectional view of the pipette tip adaptor assembly of FIG. 11.

It is desirable to minimize the disposable pipette tip insertion and ejection forces as outlined in the Patent Cooperation Treaty Patent Application Publication No. WO 2013/012588 A1. The 96 channel pipettor described here has an innovative tip loading, sealing and ejection system that works in conjunction with the pipette tip adapter detailed in the aforementioned patent application. As can be seen in FIGS. 11 and 12, the tip adapter assembly (10) is comprised of a tip adapter (9) and an 8×12 array of pipette tips (26) with 9 mm spacing between feature axes. The adapter (9) has a planar base (12) with an array of openings (14). On the top surface (16) of the adapter (9), sealing tubes (20) project upward while tip mounting tubes (22) project downward. The pipette tips (26) are mounted on the tip mounting tubes (22) with a tapered conical fit that forms an air-tight seal between the parts.

Figure 13:
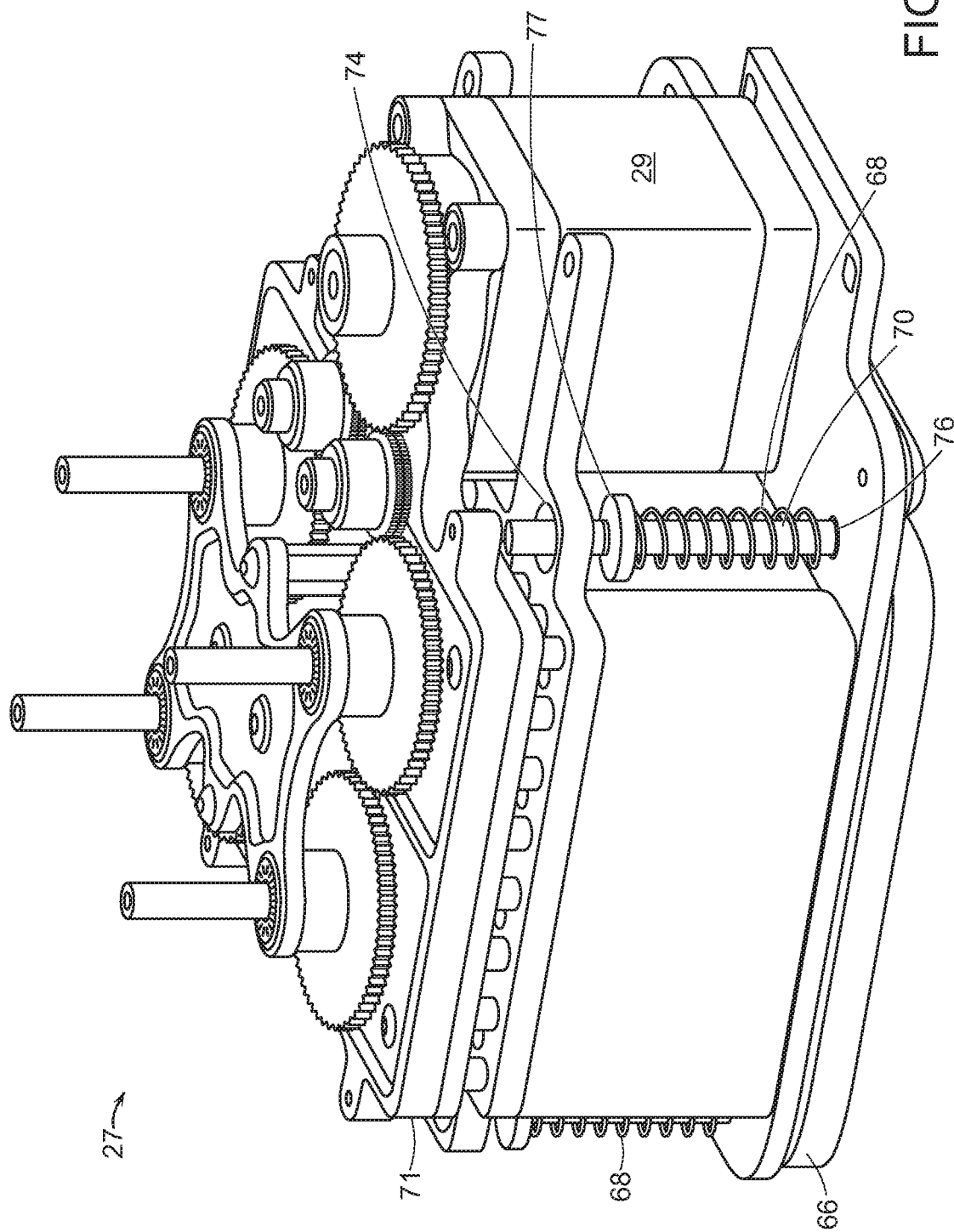
FIG. 13 shows an illustrative isometric rear view of the movable piston drive assembly of the pipette head of FIG. 6.

The tip adapter assembly (10) loading and ejection system is integrated with the pipettor and is shown in FIG. 13. The system outwardly consists of a seal compression plate (66), seal compression springs (68), seal compression shafts (70), upper bushings (74), lower bushings (76) and ejection adjustment screws (71). The loading and ejection system is operated by the stroke of the piston drive assembly (27) and its drive motor (29). This secondary function of the piston drive assembly (27) does not interfere with accurate pipetting because interaction between the piston drive assembly (27) and the tip loading and ejection system occurs outside of the pipetting stroke range, when the piston drive assembly (27) is closest to the cylinder block assembly (31).

Figure 14:
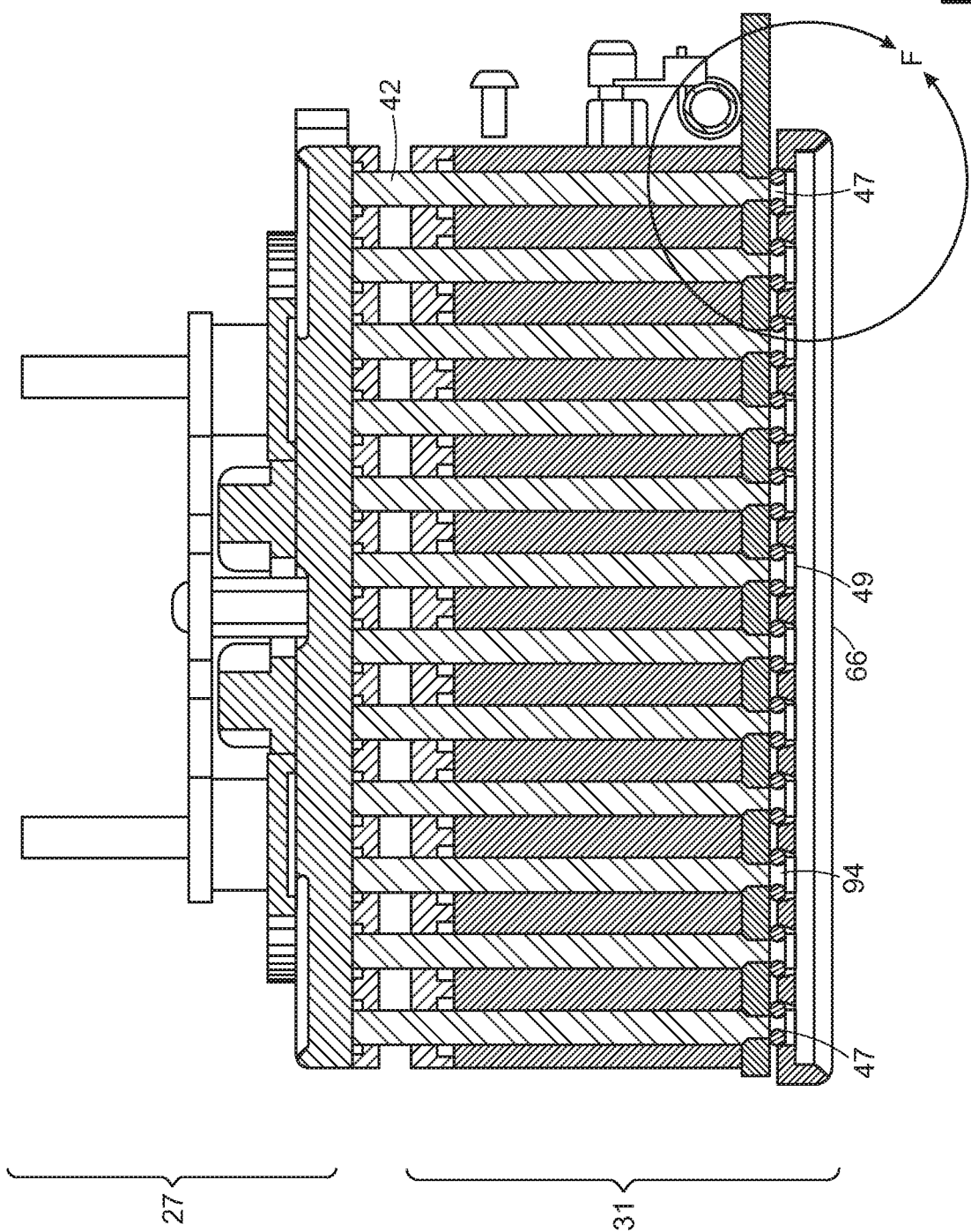
FIG. 14 shows an illustrative side sectional view of the cylinder block assembly of the pipette head of FIG. 6.
Figure 15:
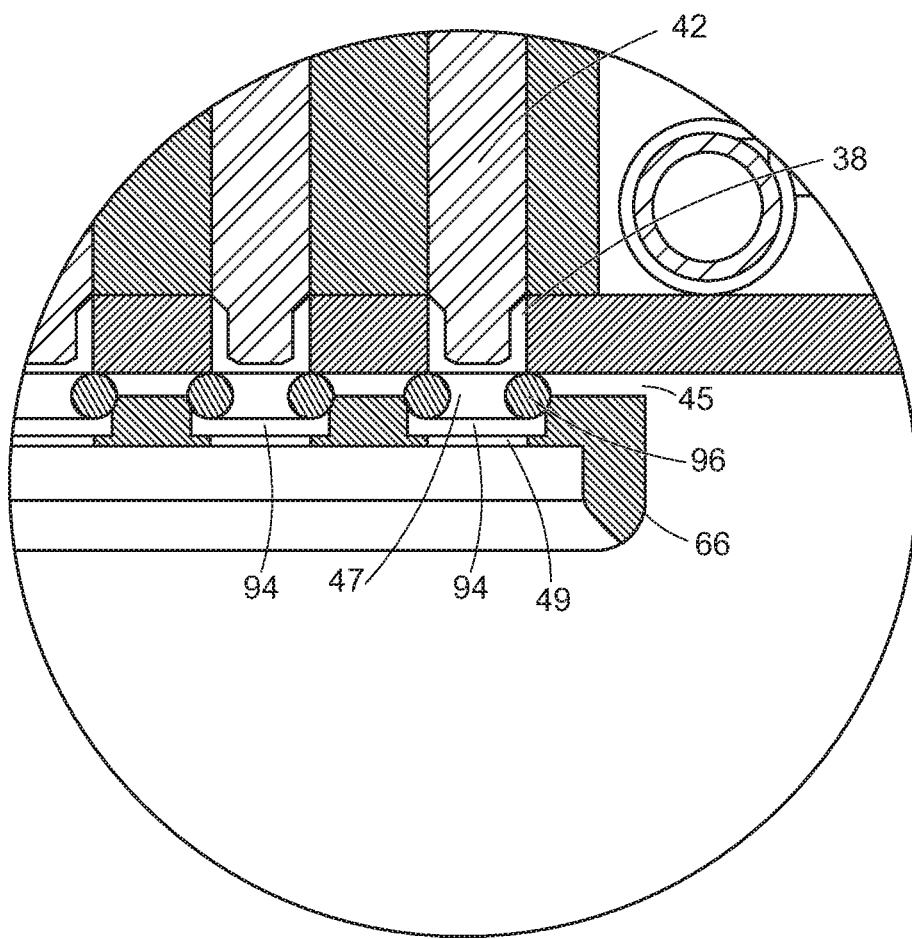
FIG. 15 shows an illustrative enlarged view of a portion of FIG. 14.
Figure 16:
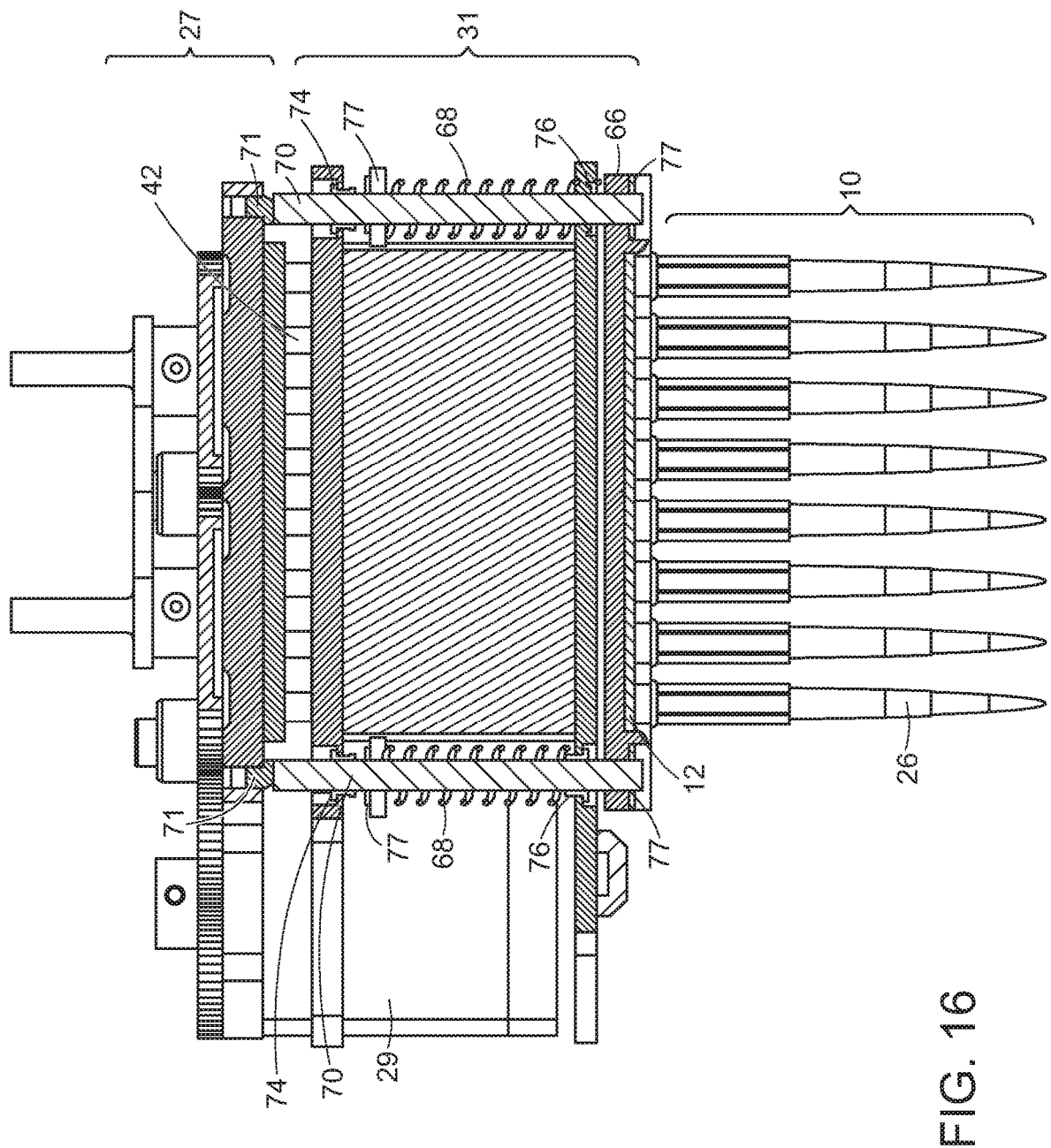
FIG. 16 shows an illustrative side sectional view of the pipette head of FIG. 6 with a pipette tip adaptor assembly attached.

A detailed section view of the adapter loading and ejection system can be seen in FIGS. 14, 15 and 16. Adjustment screws (71) are provided for accommodating tolerance stack up in the assembly so that their tips contact the mating top surfaces of the seal compression shafts (70) simultaneously. The adjustment screws (71) move with the piston drive assembly (27) and push the seal compression shafts (70) when the pairs are in contact to the various positions required for tip adapter (10) loading and ejection. In these FIGS. 14-16, it can be seen that O ring seals (47) are positioned coaxially with the pipettor's pistons (42), cylinders (38) and adapter receiving ports (49) built into the seal compression plate (66). In the position shown in FIG. 15, the O rings (47) are in a free state and are positioned coaxially with the pistons (42) by the chamfers (96) on the upper edges of the compression plate bores (94).

Figure 17:
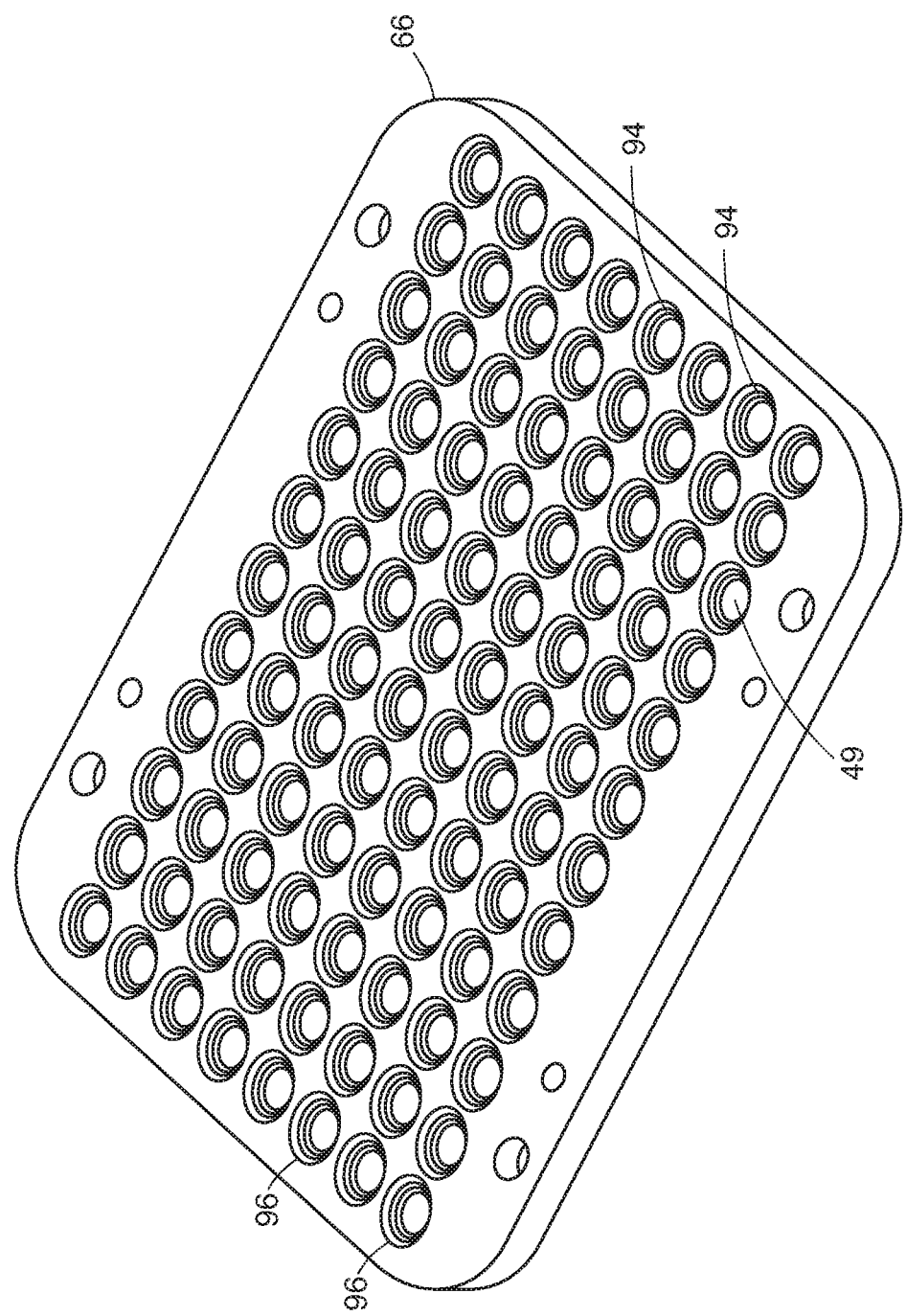
FIG. 17 shows an illustrative isometric view of the seal compression plate used in the pipette head of FIG. 6.

FIG. 17 is a detailed view of the seal compression plate (66), and its counter bores (94), chamfers (96) and adapter receiving ports (49) can be more clearly seen. The main operative component of the tip loading and ejection system is the seal compression plate (66) shown in FIG. 17. This plate has two functional positions, clamped and released, between which it toggles.

Figure 18:
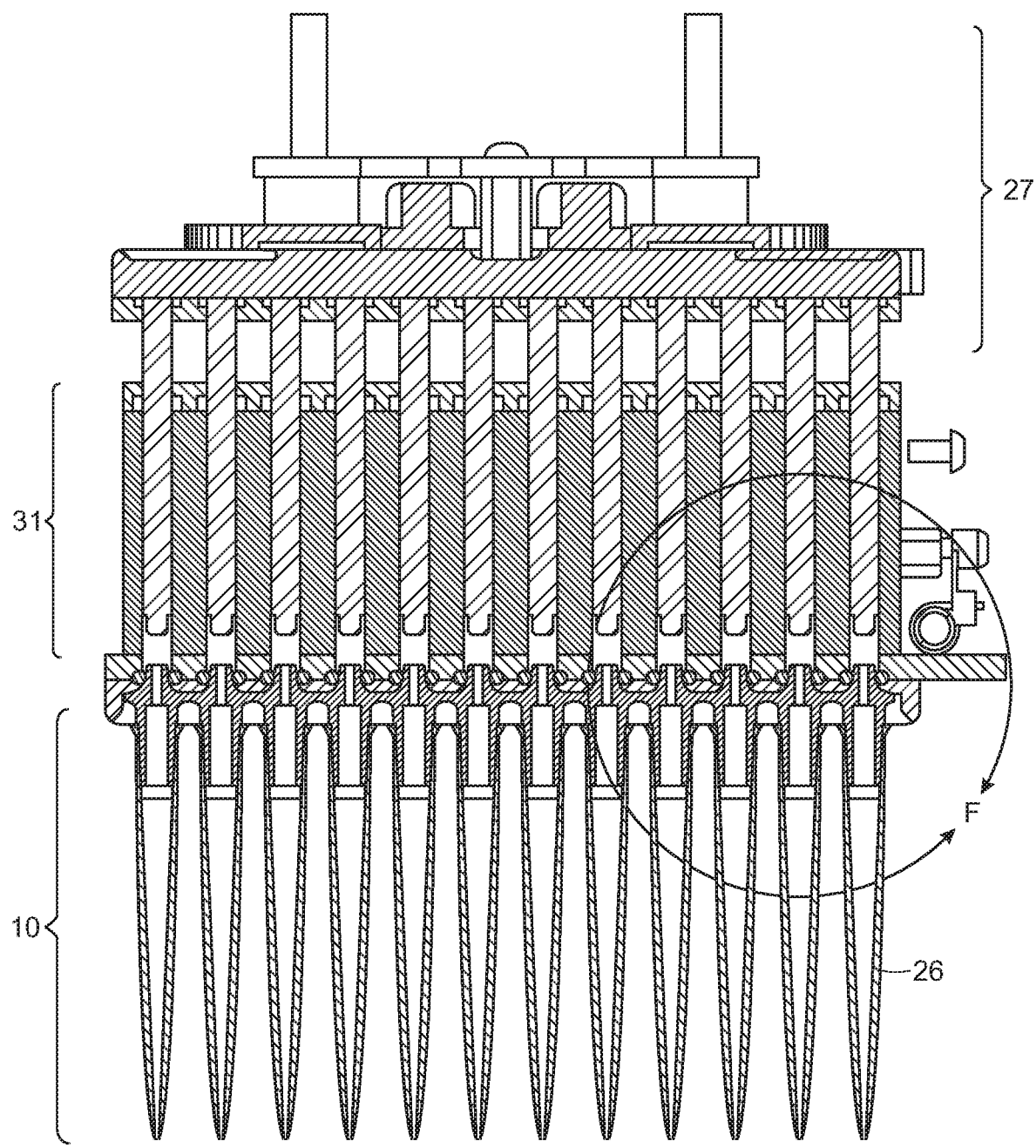
FIG. 18 shows an illustrative side sectional view of the pipette head of FIG. 6 engaging a pipette tip adaptor assembly.
Figure 19:
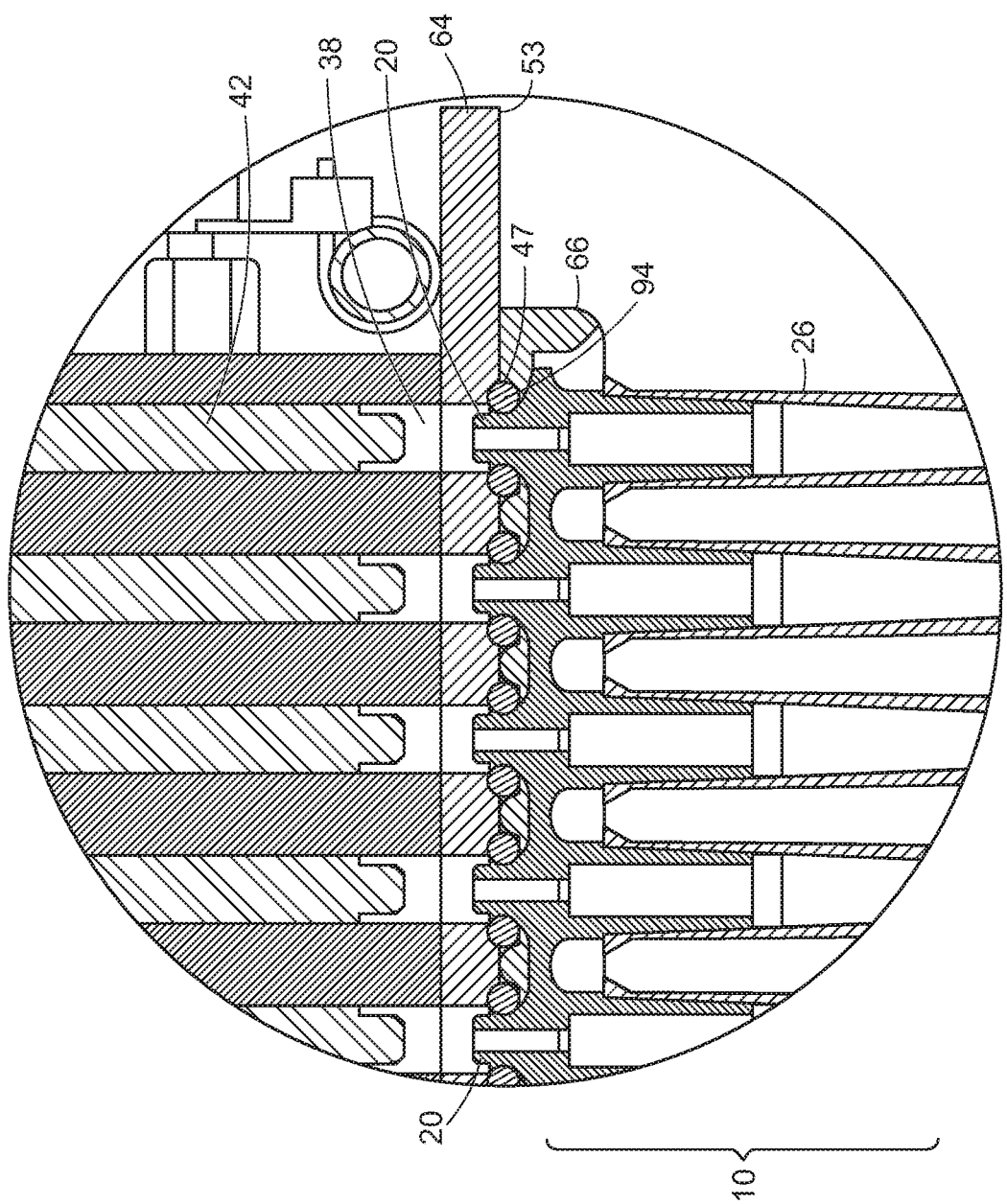
FIG. 19 shows an illustrative enlarged view of a portion of FIG. 18.
Figure 20:
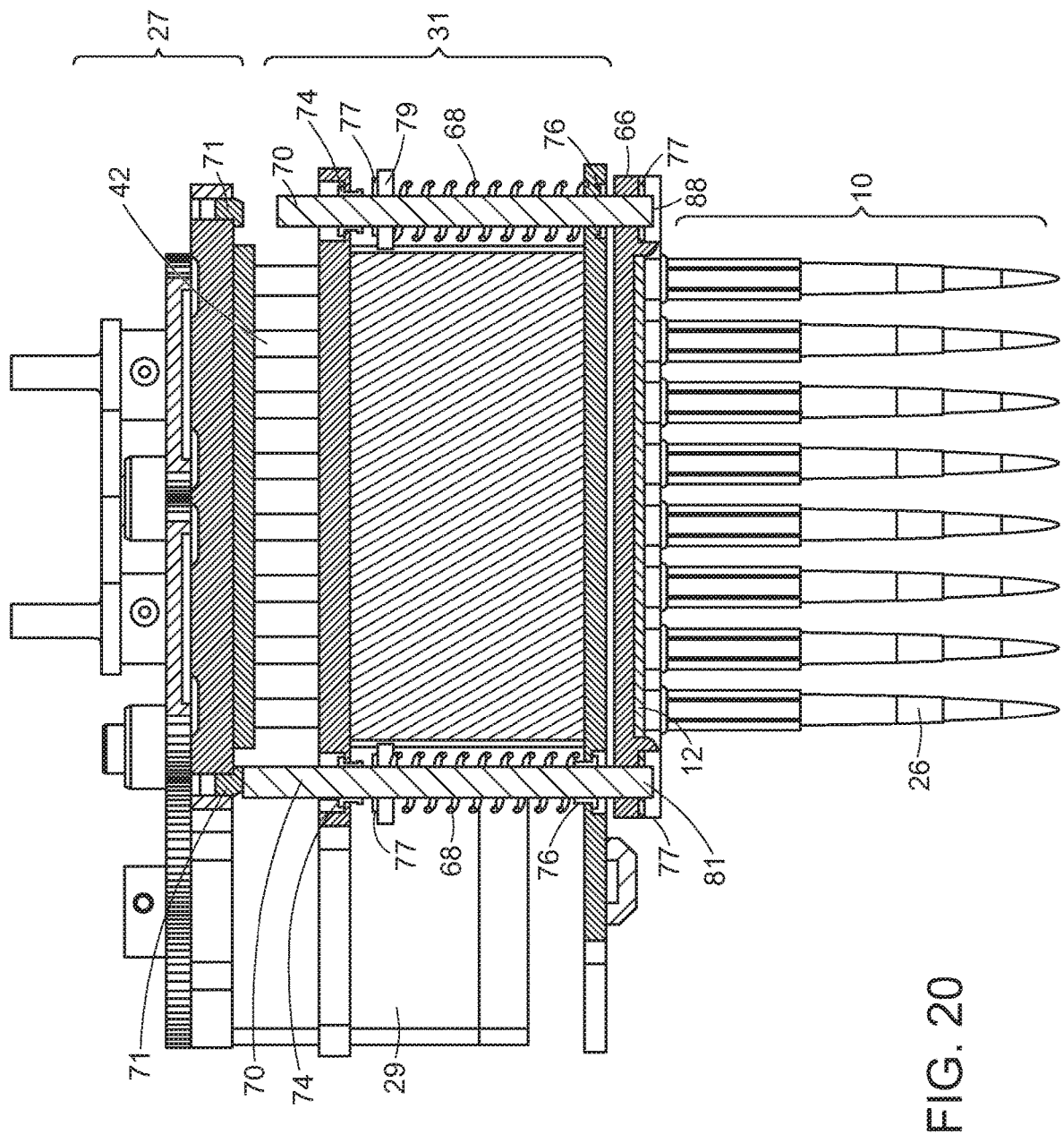
FIG. 20 shows an illustrative side sectional view of the pipette head of FIG. 6 with the pipette tip adaptor assembly attached.

For the purpose of this description, the ejection and loading cycle begins with a tip adapter assembly (10) installed in the pipettor (32). The seal compression plate (66) is in its clamped position as shown in FIGS. 18, 19 and 20, and the adjustment screws (71) are not in contact with the upper ends of the seal compression shafts (70). Each seal compression shaft (70) is strongly biased in the upward direction by a seal compression spring (68). The lower ends of the seal compression springs (68) are mounted against the upper surface of the lower cylinder block plate (64), and their upper ends push against a retaining ring (77) mounted in an upper groove (79) machined into the surface of each seal compression shaft (70). A second retaining ring (77) is mounted in a lower groove (81) of each seal compression shaft (70), and is positioned so that when clamped, the biasing force of the seal compression springs (68) is transferred to the seal compression plate (66), in turn strongly biasing the seal compression plate (66) towards the lower cylinder block plate (64).

In this clamped position, each of the 96 sealing O rings (47) is forced into a coaxial counter-bore (94) in the upper surface of the seal compression plate (66). The depth of each counter-bore (94) has been selected so it is slightly less than the thickness of the o rings (47). As a result, the upper surfaces of the o rings (47) project above the top surface of the seal compression plate (66). This slight protrusion of the o rings (47) seals each of them against the respective opening in the bottom of the corresponding, coaxial cylinder (38) when in this clamped position.

Additionally, the inside diameter of each counter-bore (94) and outside diameter of its related o ring (47) has been selected and sized such that when the o ring (47) is forced into the counter-bore (94) by the upward biasing force of the seal compression springs (68), an interference occurs between the o ring (47) and cylindrical walls of the counter-bore (94) which compresses and reduces the outside diameter of the o rings (47) until they fit into the counter-bores (94). This interference fit causes the inside diameter of the o ring (47) to shrink, so that it has an interference fit to the outside diameter of the sealing tubes (20) of the adapter assembly (10). The result is an airtight seal between the o ring's (47) internal surfaces and the external surfaces of the sealing tubes (20). Thus the pipette tips (26), though the tip adapter assembly (10) and o rings (47) are sealed to the corresponding cylinders (38) of the pipettor (32). It should be noted that when the o rings (47) are in their free state, the internal diameter of the O rings (47) is slightly larger than the external diameter of the sealing tubes (20).

Figure 21:
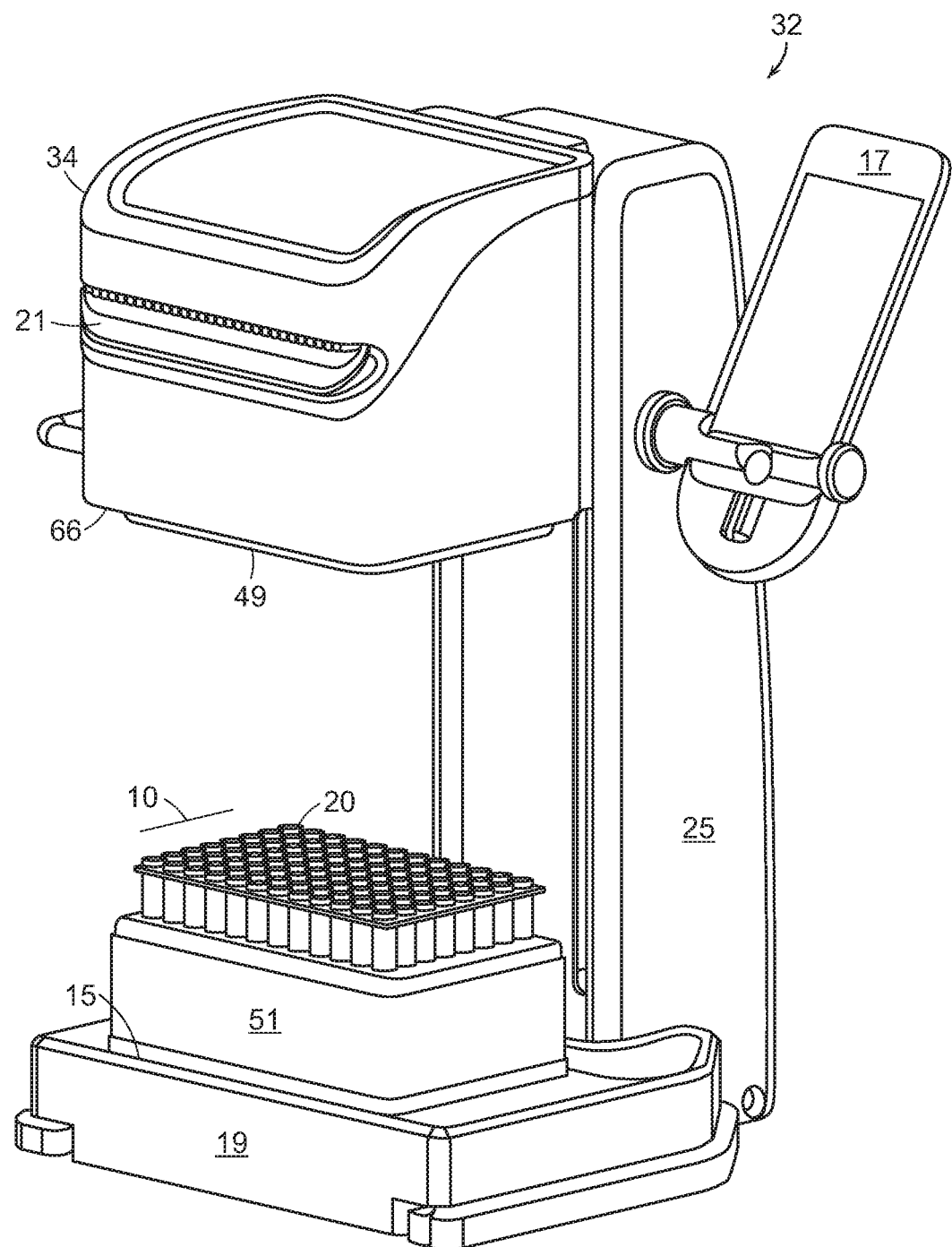
FIG. 21 shows an illustrative diagrammatic isometric view of an air displacement pipettor of FIG. 1 using a protective rack.

When the operator wants to eject the tips, typically after a pipetting operation, the pipettor (32) is put into a tip ejection mode through the user interface (17). Preferably, the empty rack (51) is place in the nest (15) as can be seen in FIG. 21, and the tip adaptor assembly (10) and head (34) are lowered onto the rack (51) so as to be received by the rack on ejection. A confirmation to eject the tips is made by pressing the run button (21) on the pipetting head (34). An instruction is sent by the control system to move the piston drive assembly (27) so that the adjustment screws (71) come into contact with, and then displace, the seal compression shafts (70) in a downward direction.

Figure 22:
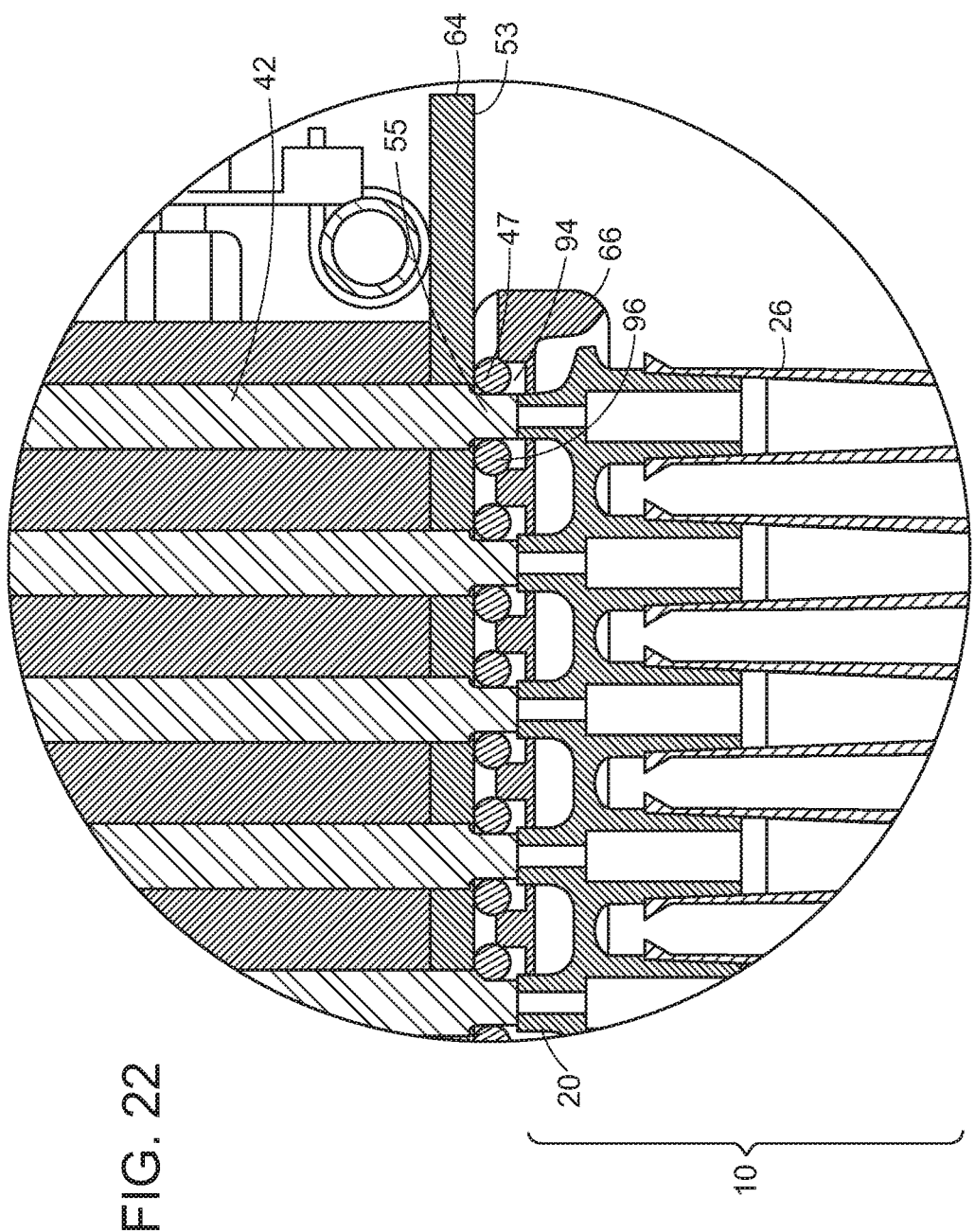
FIG. 22 shows an illustrative enlarged sectional view of a portion of the pipette head of FIG. 6.
Figure 23:
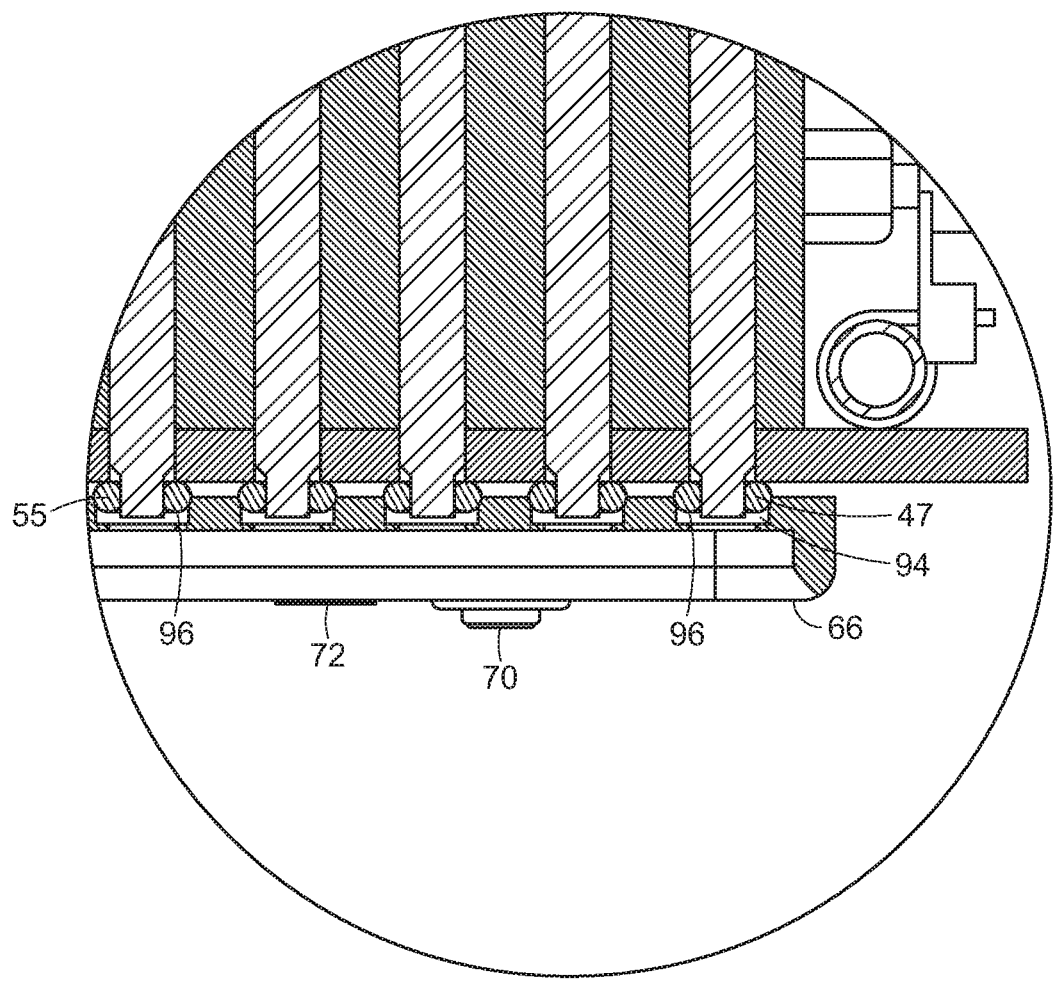
FIG. 23 shows an illustrative view similar to that of FIG. 22 without the attached pipette tip adaptor assembly.
Figure 24:
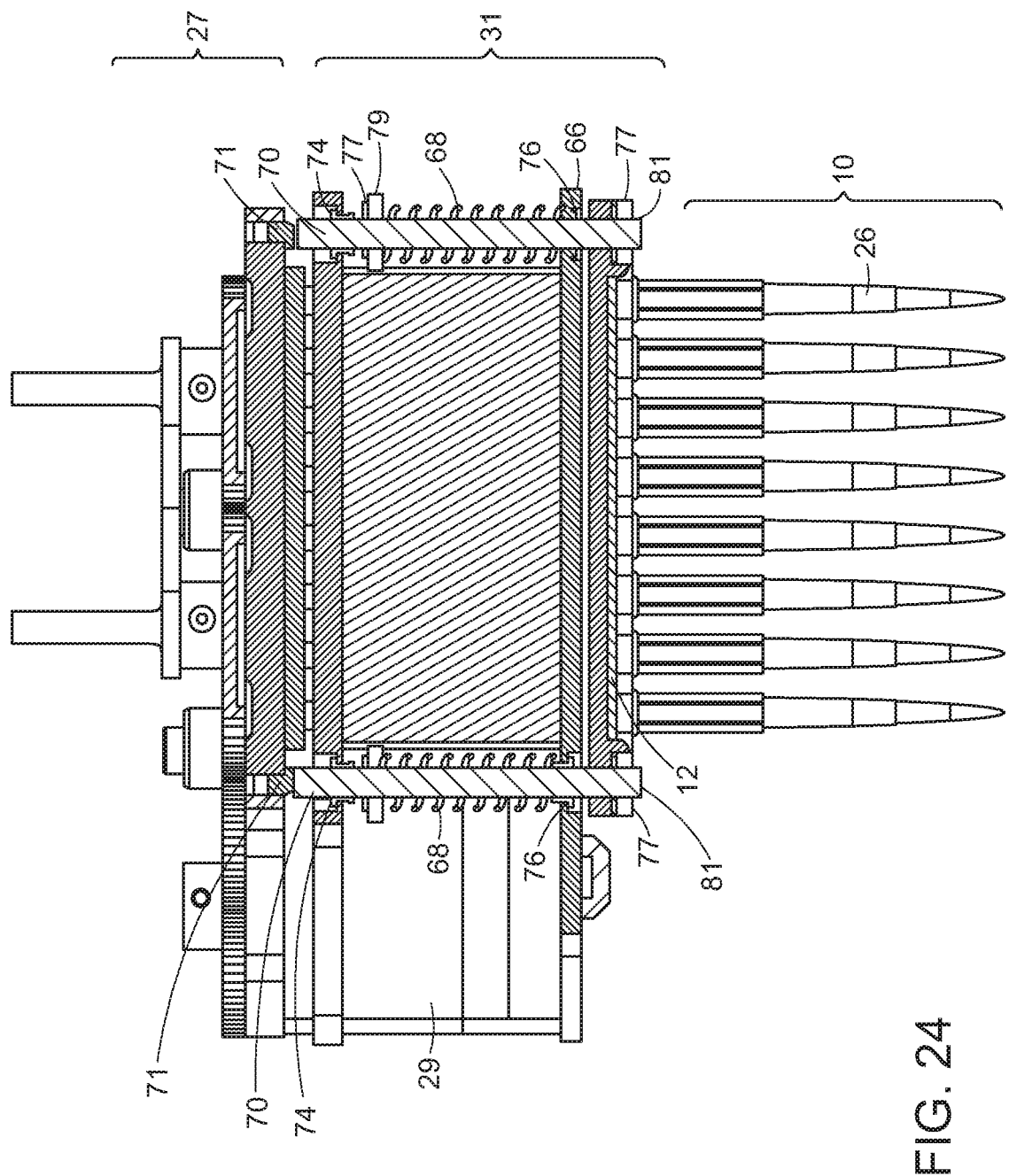
FIG. 24 shows an illustrative side sectional view of the pipette head of FIG. 6 with a pipette tip adaptor assembly attached in accordance with another embodiment.

The ejection process occurs in three stages, which happen sequentially and are driven by the motion of the piston drive assembly (27). The first stage can be seen in FIG. 16 and releases the spring biasing force on the seal compression plate (66), the second stage, which can be seen in FIGS. 22, 23 and 24, is the push-out of the tip adapter assembly (10) by the reduced ends (55) of the pistons (42), and the final stage is a return to a ready-to-load state as shown in FIG. 14.

Figure 26:
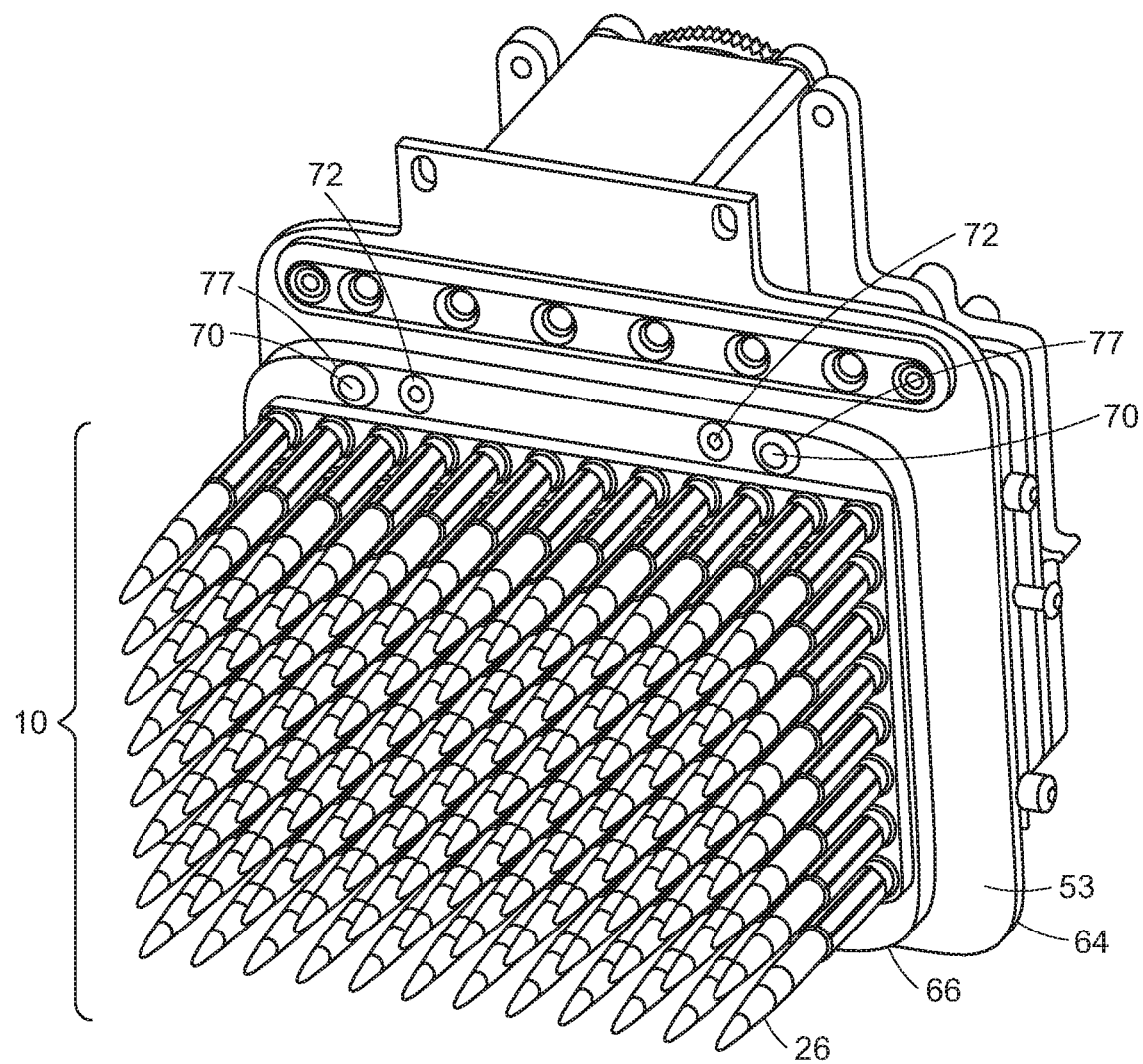
FIG. 26 shows an illustrative isometric view of the underside of the pipette head of FIG. 1 with the pipette tip adaptor assembly attached.
Figure 27:
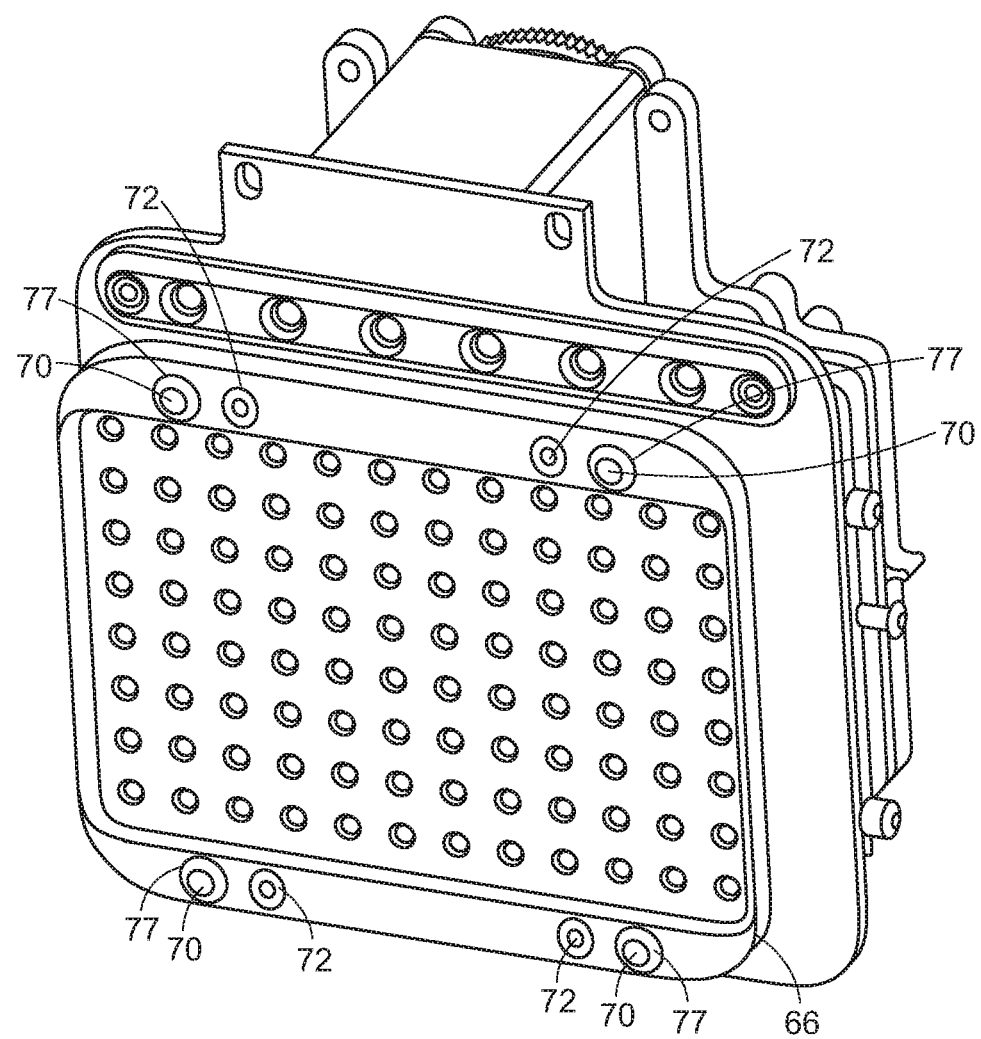
FIG. 27 shows an illustrative isometric view of the underside of the pipette head of FIG. 26 with the pipetted tip adaptor assembly removed.

The first stage of the ejection process is complete when the seal compression shafts (70) are displaced to a position that releases the biasing force of the seal compression springs (68) from the seal compression plate (66). This position is shown most clearly in FIG. 16. The biasing force is eliminated when the retaining rings (77) come out of contact with the seal compression plate (66) as they advance in a downward direction. Shoulder screws (72) can be seen in FIGS. 26 and 27, and are provided to limit the travel of the seal compression plate (66), as the seal compression shafts (70) continue to advance into the second stage region of the ejection stroke.

Once pressure is released from the seal compression plate (66), the resiliency of the o rings (47), and the design of the interference fit to the counter-bores (94) cause them to be released from their respective counter-bores (94), so they are in the position shown in FIG. 15. This release is aided by a slight taper that has been incorporated into the cylindrical walls of the counter-bores (94), and the size and geometry of the chamfer (96) leading into each of the counter-bores (94).

The piston drive assembly (27) continues to advance in a downward direction until the reduced diameter of the piston ends (55) come into contact with the top surface of the sealing tubes (20) of the tip adapter assembly (10) and push them out of their respective O rings (47) and out of the pipettor head (34). This relationship can best be seen in FIGS. 22, 23 and 24. Because the seal compression plate (66) is no longer clamped, and the o rings (47) are no longer within their respective counter-bores (94), the interference fit that existed between the internal surfaces of the o rings (47) and the external surfaces of the sealing tubes (20) is eliminated and the tip adapter assembly (10) is easily ejected.

It should be noted that the relationship between the length of the shoulder screws (72) and the seal compression plate (66) has been selected to limit the gap (45) that is formed between the seal compression plate (66) and the bottom surface (53) of the lower cylinder plate (64). By limiting this gap (45) dimension to less than the thickness of the o rings (47), the positions of the o rings (47) are confined to the space formed by the chamfer (96) on the upper edge of the respective counter-bore (94) and the bottom surface (53) of the lower cylinder block plate (64), and thus are in the correct coaxial position to receive the next tip adapter assembly (10) installed in the pipettor (32). This is best seen in FIG. 15.

After ejection of the tip adapter assembly (10), the piston drive plate (27) reverses direction and moves to a third position in which the pipettor (32) is ready to receive the next tip adapter assembly (10). In this position, the pistons (42) are retracted slightly and the seal compression plate (66) is in a released position. As mentioned previously, in this position, the o-rings are in a relaxed state and are positioned coaxially with the counter-bores (94) of the seal compression plate (66). This position is shown in FIGS. 14, 15 and 16.

Figure 25:
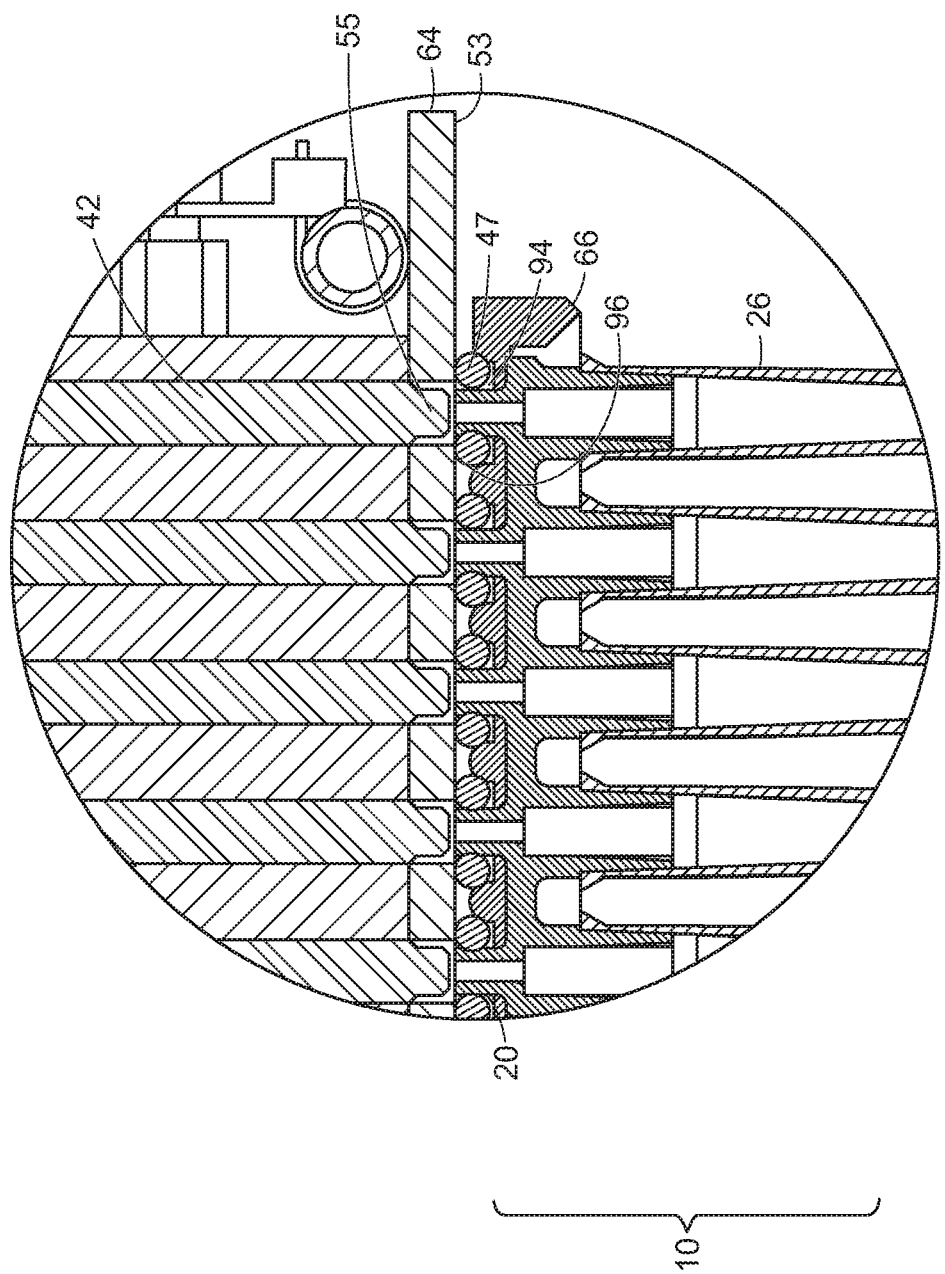
FIG. 25 shows an illustrative enlarged sectional view of a portion of the pipette head of FIG. 24.

The final step in a complete tip adapter ejection and load cycle is loading of a new tip adapter assembly (10). In FIG. 21, it can be seen that the tip adapter assembly (10) is packaged in a protective rack (51) that shares its base dimensions with those of a standard microtiter plate (11), so that when inserted into the nest (15), the sealing tubes (20) of the adapter assembly (10) are axially aligned with the adapter receiving ports (49) of the seal compression plate (66). To load the adapter assembly (10) into the pipettor (32), the operator simply places the rack holding the adapter assembly (10) into the nest (15) and lowers the head (34) until it comes into contact with, and is stopped by, the adapter assembly (10). The relationship between the adapter assembly (10) and the instrument (32) can most clearly be seen in FIG. 25, which is a sectional view of the adapter sealing area. The sealing tubes (20) of the adapter assembly (10) are projecting through the adapter receiving ports (49) and the opening in the o ring seals (47). The force required to move the head into this position is minimal because of the aforementioned sizing relationship between the o ring seals (47) and the sealing tubes (14).

Once in this position, the operator presses the run button (21), that signals to the control system to turn the motor (29) in a direction and to a position, which takes the ejection adjustment screws (71) out of contact with the seal compression shafts (70). The change in the position of the piston drive assembly (27) allows the seal compression springs (68) to extend and once again bias the seal compression plate strongly in the direction of the bottom surface (53) of the lower cylinder block plate (64), narrowing the gap (45) between the two plates. FIGS. 18, 19 and 20 show the position of the piston drive assembly (27), with the tip adapter assembly (10) fully engaged and sealed to the instrument. The change in position of the seal compression plate (66) causes the o ring seals (47) to once again be forced into the associated counter bores (94), sealing the tip adapter assembly (10) to the pipettor (32), completing the cycle.

Figure 28:
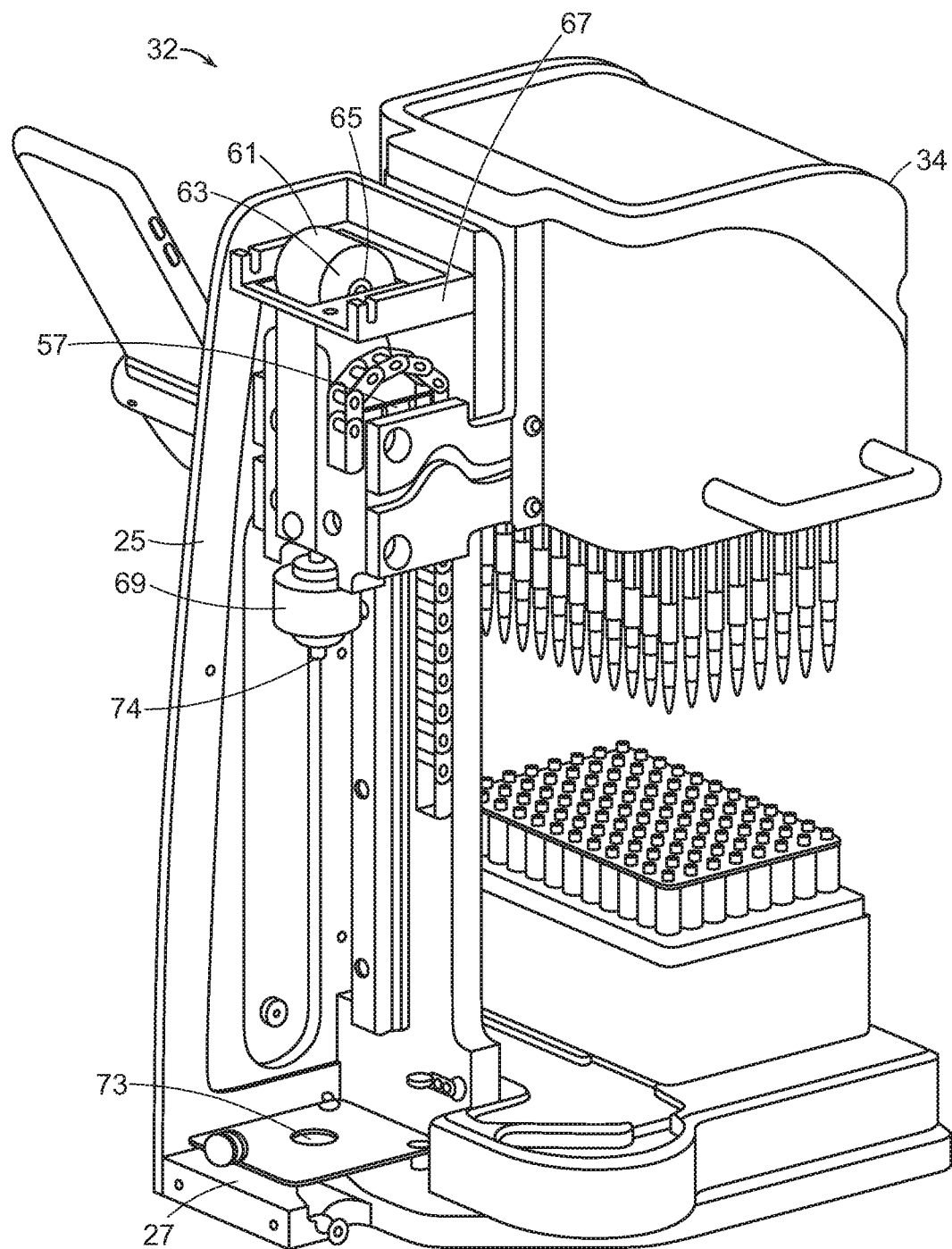
FIG. 28 shows an illustrative isometric rear view of the air displacement pipettor of FIG. 1 with a cover on the base tower removed.
Figure 29:
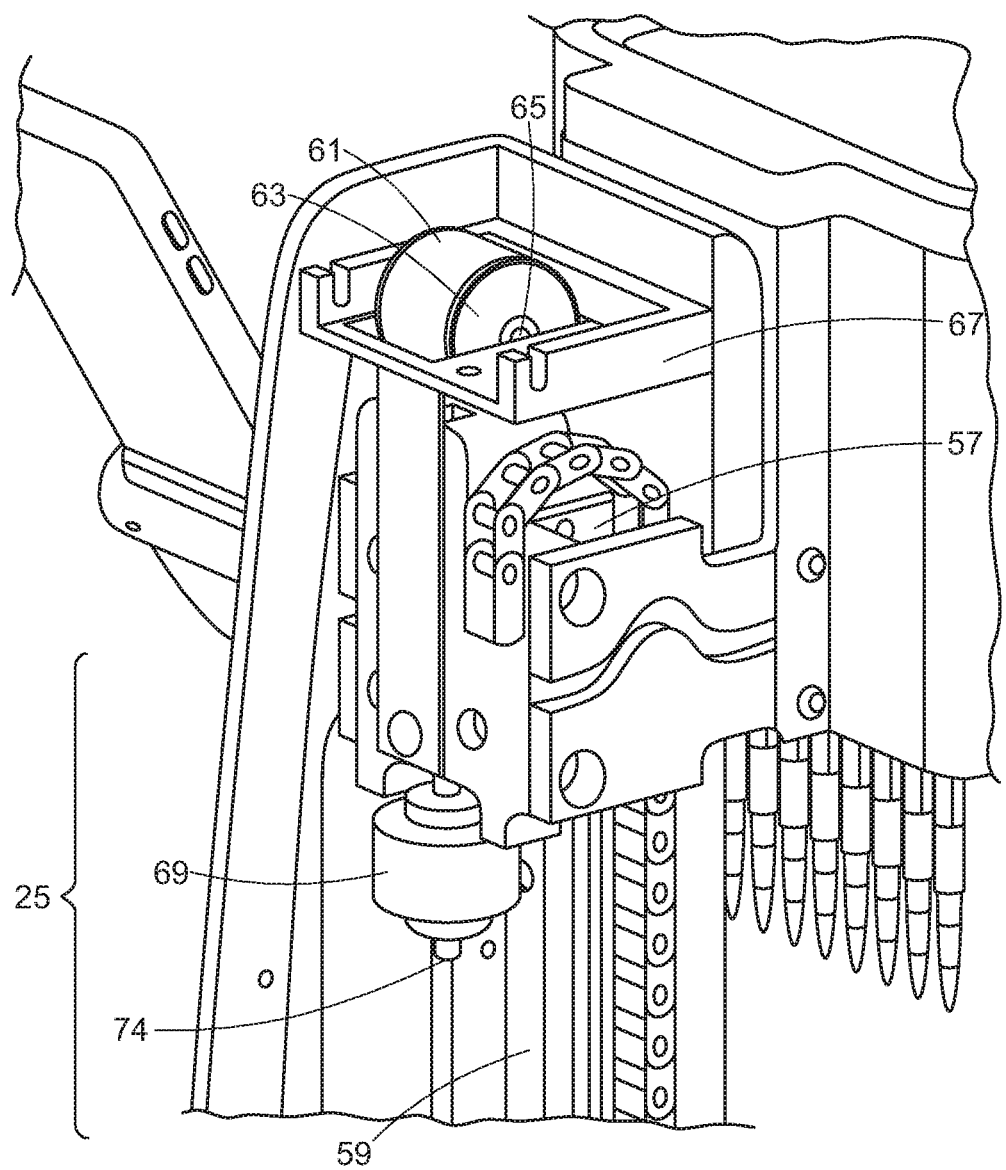
FIG. 29 shows an illustrative enlarged view of a portion of FIG. 28.
Figure 30:
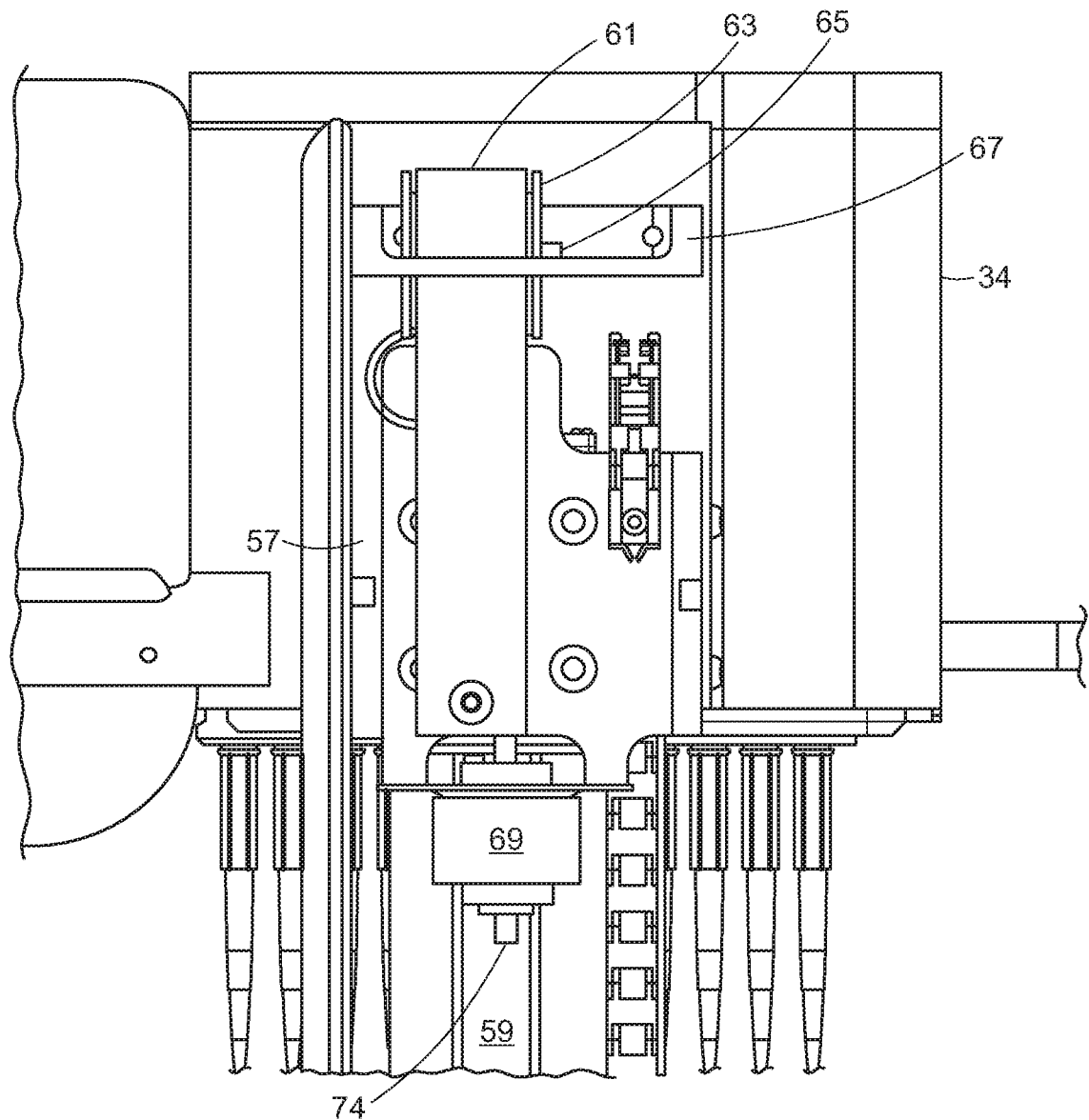
FIG. 30 shows an illustrative end view of a portion of the air displacement pipettor shown in FIG. 28.

FIGS. 28, 29 and 30 are views of the rear of the pipettor (32) with certain covers removed so the construction detail of the base tower (25) is revealed. The pipetting head (34) is mounted to a carriage (57) which runs on a rail (59). The carriage and rail engage to provide precision linear motion and are configured in this design to allow for vertical, or "Z axis" travel of the pipetting head (34).

The weight of the pipetting head (4) and all associated components that move in the Z axis are perfectly counterbalanced by a constant force spring (61) which is mounted on a drum (63). The drum has a shaft (65) running through its center and supported by a bracket (67) mounted to the tower, which allows the drum and constant force spring to rotate as the pipetting head is moved upward or downward. The constant force spring (61) and minor system friction are selected and sized to allow the user to effortlessly reposition the pipetting head (34) in the Z axis. The user can release the pipetting head (34) in any allowed position along its travel and the head will remain in that position until repositioning is desired.

In accordance with certain embodiments, the invention provides a pipetting system that includes a pipette head including a multichannel air displacement system for aspirating and dispensing liquids, a pipetting system base that includes a linear guide system along which the pipette head may be moved vertically with respect to the pipetting system base, and a counterbalance unit for counterbalancing at least a portion of a weight of the pipette head. In certain embodiments, the counterbalance unit provides a constant force, and may be provided by a constant force spring. The counterbalance unit counterbalances a combined weight of the pipette head and an array of pipette tips.

It is desirable to accurately control the position of the pipette tip openings in the vessel from or to which liquids are being aspirated or dispensed. For example, it is desirable to submerge the pipette tip openings deeply into the liquid so that air, instead of liquid, is never drawn into the tips for the duration of the aspiration event. If air is aspirated into the tips, accuracy and precision across all pipetting channels will be degraded. Also, when dispensing very low volumes of liquid into an empty vessel, such as a microtiter plate (11), it is desirable to bring the pipette tip openings in close proximity (i.e., 0.5 mm) to the bottom surface of the vessel without touching, so that compete droplet transfer occurs from the pipette tips (26) to the microtiter plate (11). The pipettor (32) of the present disclosure has an electronically controlled adjustable stop system build into the z axis mechanism that avoids these problem and other issues related to inaccurate positioning of the tip openings with respect to the liquid or vessel surfaces.

The adjustable stop system components include an electric linear actuator (69) mounted to the carriage (57) that moves with the pipetting head (34) in the vertical direction. The end of the repositionable shaft (74) of the linear actuator (69) acts as a position stop for the downward travel of the pipettor head assembly by interacting with a fixed stop (73) mounted to the base (23) of the pipettor. The controller (17) allows for programming of the stop position for various receiving plates and reservoirs. The stop position is adjusted and set through the pipettor controller (17). It should be obvious that the location of the linear actuator can be reversed in position so it is a fixed feature of the base and its repositionable shaft (74) interacts with a stop on the head assembly. The linear actuator (69) is responsive to linear actuator motor commands from the remote controller (17) in wireless communication with the controller processor board (30) shown in FIG. 5. The controller processor board (30) is in direct wired communication with the linear actuator (69).

The adjustable stop system also includes a sensor that can determine the location of the bottom surface of a vessel, for example the floors of the wells in a microtiter plate (11). Once the bottom surface is detected, the controller can then set the stop position so the pipette tip openings are a desired distance above the surface. When the pipettor (32) is put into a mode for detecting the bottom surface of a vessel, a sequence of events is initiated by the controller. First, the repositionable shaft (74) of the linear actuator (69) is completely retracted, corresponding to the lowest possible z axis position for the pipetting head (34).

With a pipette tip adapter installed in the instrument (32), the user is instructed to slowly lower the pipetting head until the tips are resting on the bottom surface of the vessel. Once indicated to the pipettor controller that this position has been reached, the controller slowly advances the repositionable shaft (74) from the retracted position until it contacts the fixed stop and begins to move the pipetting head upward. The upward movement of the pipetting head (34) is detected by the sensor, which signals to the control system that the simultaneous position of the linear actuator corresponds to the pipette tip ends in contact with the surface to be detected. The user can then program the distance above the bottom surface of the vessel at which the tip openings are stopped. The desired clearance between tips and surface is added to the linear actuator position, and stored in system memory. Sensing this upward motion of the pipetting head (34) can be achieved by a number of simple technologies that include MEMS devices (accelerometer), optical sensors, microswitches or other suitable sensor.

In certain embodiments of the invention therefore, the pipetting system further includes a linear actuator motor system for reciprocally moving a repositionable shaft as an adjustable stop. In further embodiments, the multichannel air displacement system further includes a displacement motor for reciprocally moving pistons is respective cylinders responsive to displacement motor commands, as well as a plurality of gears that are driven by a displacement motor, which may be mounted on a piston drive plate.

In certain embodiments, the multichannel air displacement system aspirates and dispenses liquids responsive to displacement motor commands, the linear actuator motor reciprocally moves a repositionable shaft responsive to linear actuator motor commands, and the linear actuator motor commands and the displacement motor commands are provided by a control system.

Figure 31:
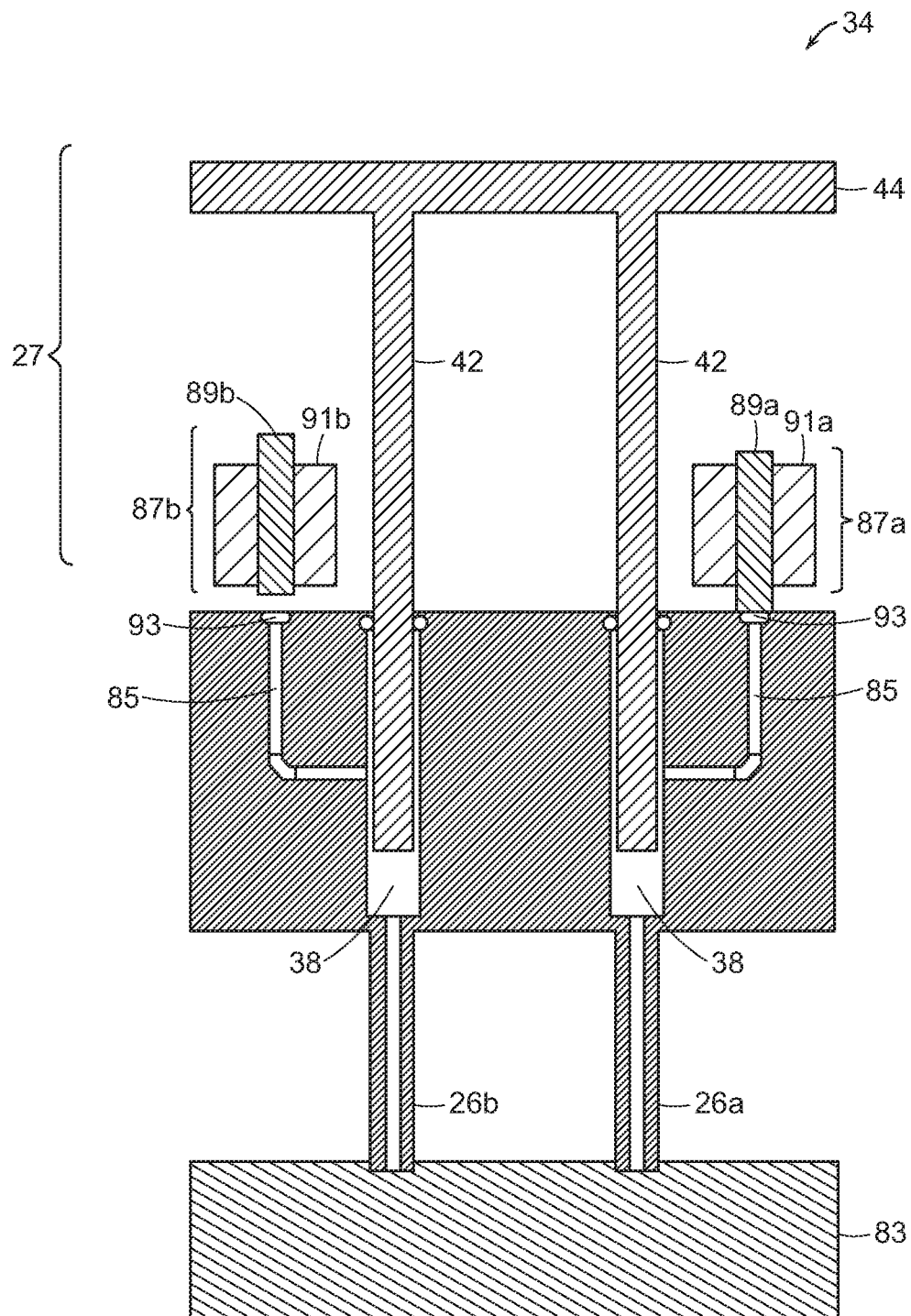
FIGS. 31-35 show illustrative side sectional views of two pipette tips used with air bleed ports in an air displacement pipettor in accordance with further embodiments of the present invention.

Yet another alternative aspect of the invention is shown schematically in FIG. 31-FIG. 35. The purpose of the system shown in these views and described here is to allow the operator to aspirate a different volume of liquid into each pipette tip (26). FIG. 31 shows a cross sectional view of a pipettor head (34). A piston drive assembly (27), with piston drive plate (44) is populated with two pistons (42) that pass through piston seal o rings (40). The piston drive assembly (27) is driven by a suitable means, such as a linear positioning system, such that the pistons (42) can be reciprocated within the cylinders (38) and moved to precision positions. In this view, the pistons are shown almost fully engaged within the cylinders (38), and are poised to aspirate liquid sample (83) into the pipette tips (26a, 26b). Each cylinder (38) is configured with an air bleed port (85) that terminates at a valve O ring seal (93) and coaxially positioned solenoid (87a, 87b), which together form a valve which can be opened or closed. The solenoid shaft (89a 89b) is normally biased against the valve O ring seal (93) when the solenoid (87a, 87b) is not energized, by a spring or other suitable means. In this biased position, the valve is closed. When the coil of the solenoid is energized, the solenoid shaft is retracted, so that it is pulled away from the valve O ring seal (93), thus opening the valve. In FIG. 31, the left solenoid (87b) is shown in an energized state, and the air bleed port (85) is open to the atmosphere. The right solenoid (87a) is de-energized and its shaft (89a) is biased against its related valve O ring seal (93) and the valve is closed.

Figure 32:
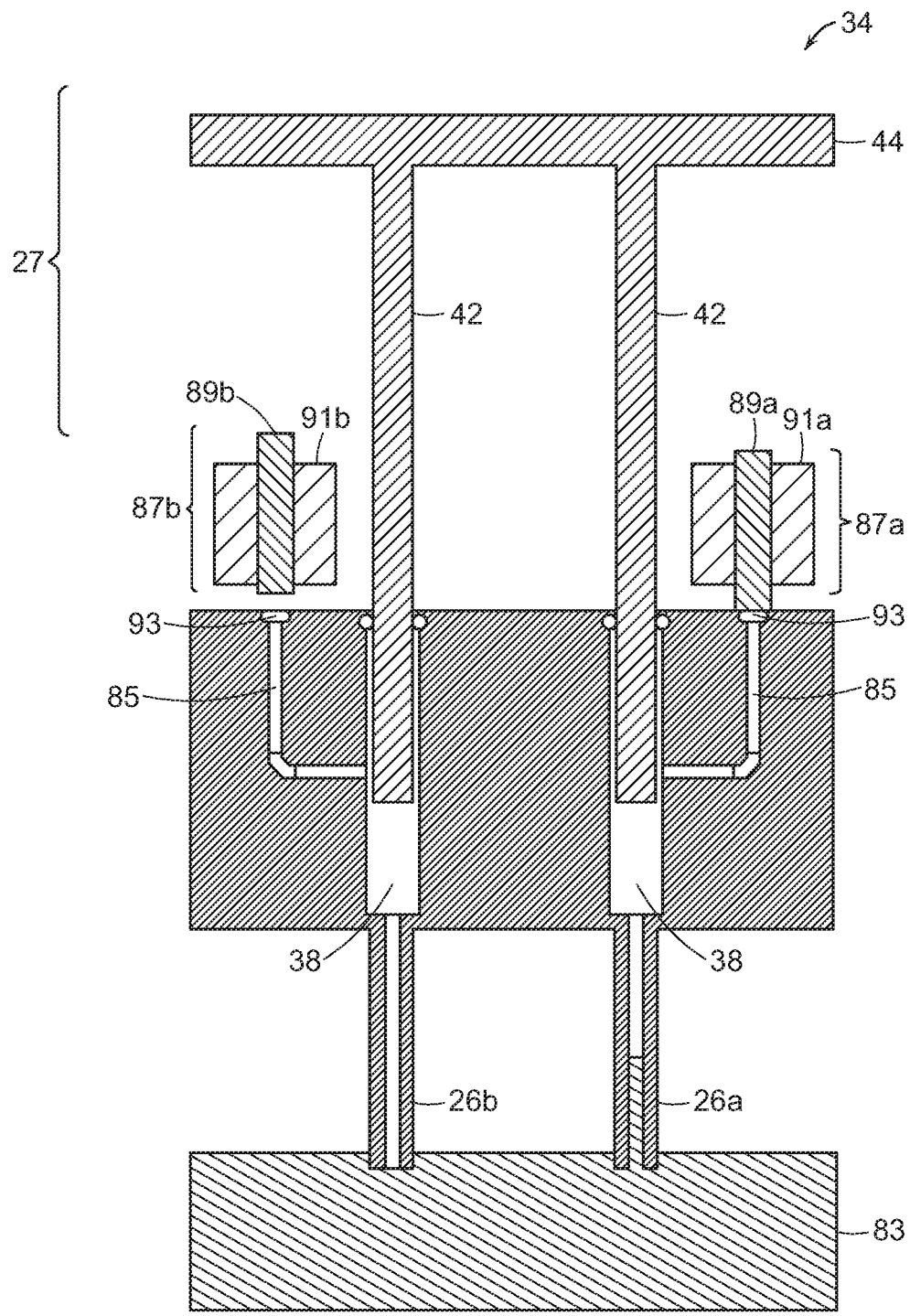
Figure 33:
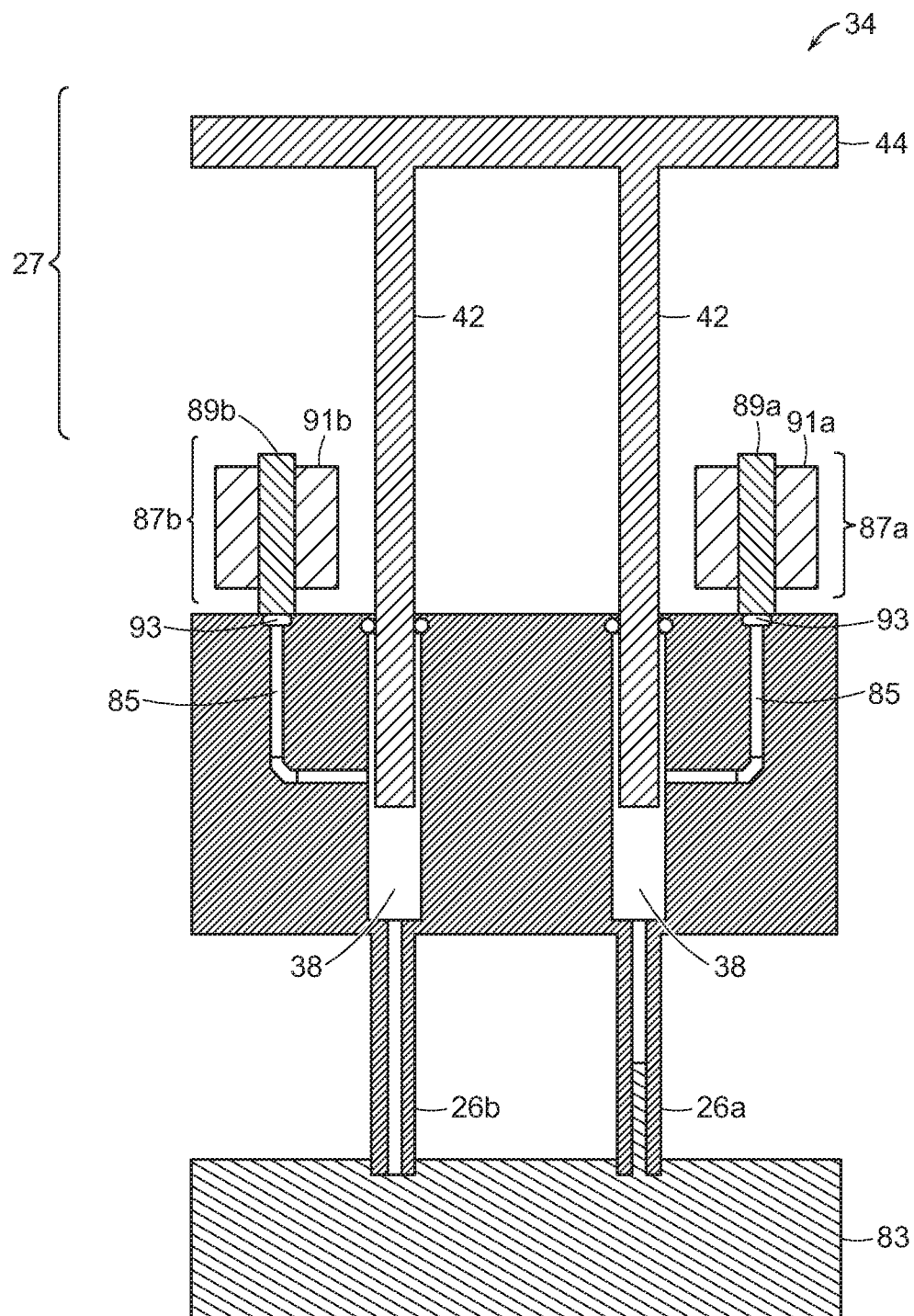

FIG. 32 shows the liquid sample (83) being drawn into the right pipette tip (26a) as the piston drive assembly (27) moves and the pistons (42) are extracted from the cylinders (38). No liquid sample (83) is pulled into the left tip (26b) because the bleed valve is open, and instead air flows into the cylinder (38). When the desired difference between the amounts of liquid drawn into the two tips (26) is reached, the piston drive assembly (27) is paused in its travel momentarily, and the left hand solenoid coil (91) is de-energized as shown in FIG. 33. Now both valves are closed.

Figure 34:
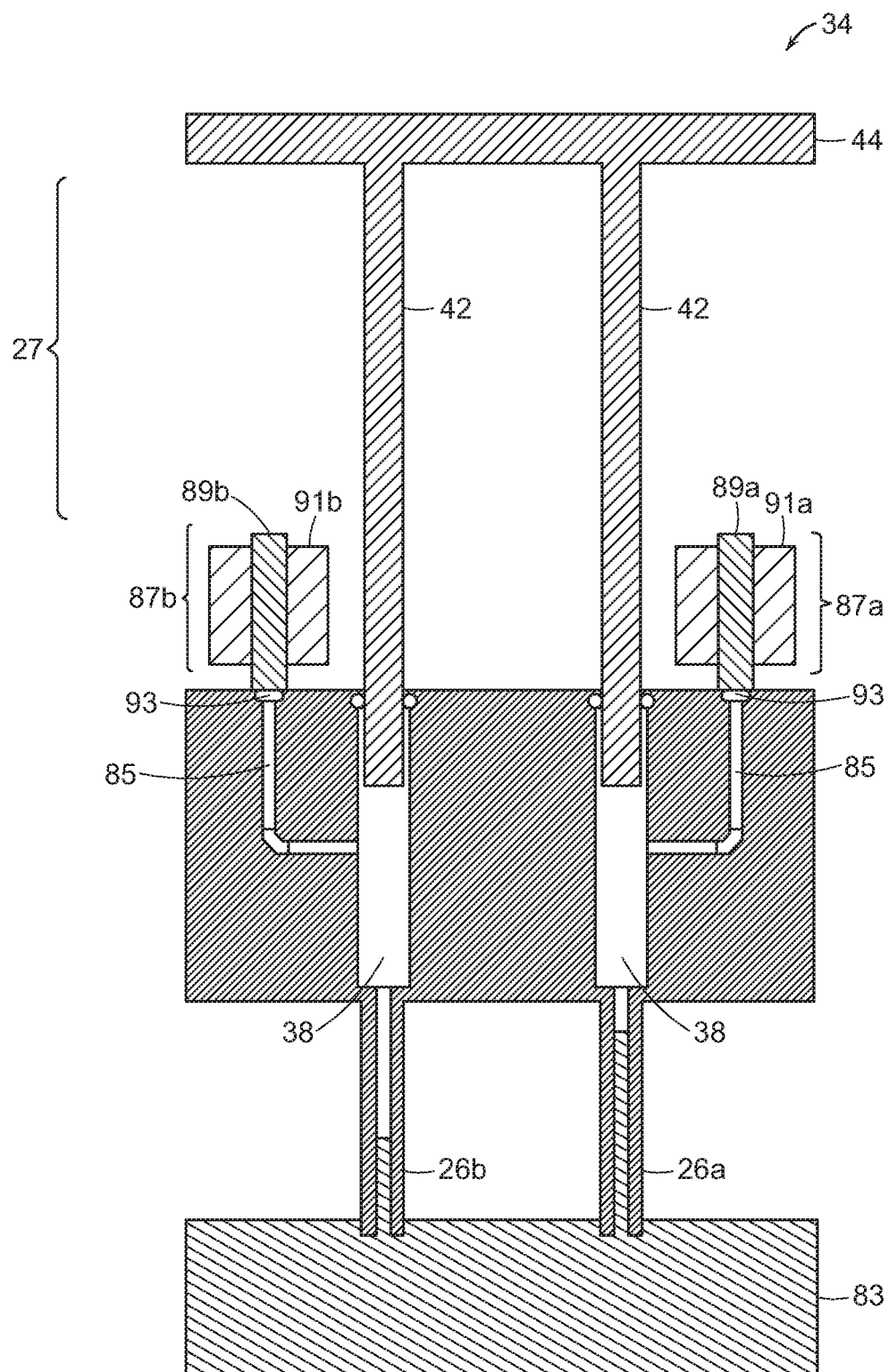

FIG. 34 shows additional movement of the piston drive assembly (27) and further extraction of the pistons (42) from the cylinders (38). Because both valves are closed, liquid sample (83) is now drawn into both pipette tips (26) as shown in FIG. 34. Through this coordinated action between the valves and piston drive assembly (27) movement, different precision volumes can be drawn into each channel of the pipettor.

Figure 35:
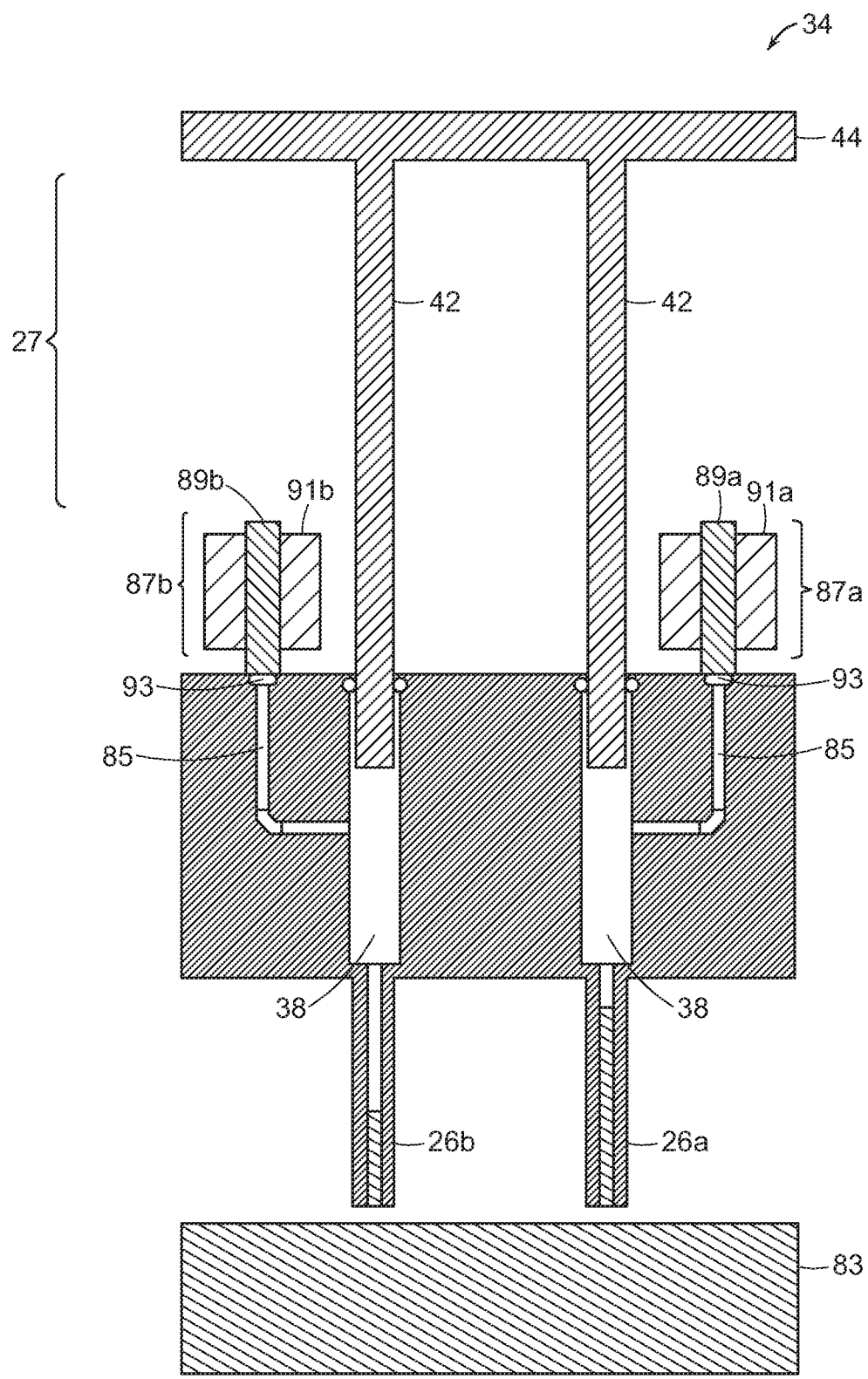

FIG. 35 shows the pipette tips extracted from the liquid sample with the differing liquid volumes in left and right pipette tips. To dispense both liquid samples (83), the piston drive plate motion is reversed with both bleed valves closed. The pistons (42) are driven into the cylinders (38) and the liquid sample (83) is dispensed from the pipette tips (26).

As a further example, if the operator desires to draw 100 microliters into the right hand tip (26a), and 50 microliters in the left hand tip (26b), then the pipettor controller configures the valves as shown in FIG. 31 and the piston drive assembly (27) moves in an aspirate direction until 50 microliters are drawn into the right hand tip (26a). The piston drive assembly (27) pauses momentarily while the left hand valve closes, and then the piston drive assembly (27) continues on, drawing an additional 50 microliters into the right hand tip (26a), and 50 microliters into the left hand tip (26b). This system can be applied to any number of pipetting channels. It should be apparent that any type of valve can be used to bleed the air into the cylinders, such as a Piezo ceramic actuated valve.

The system therefore, provides a pipetting system comprising a pipette head including a multichannel air displacement system that includes a plurality of pistons for simultaneously aspirating liquids into a plurality of pipette tips, wherein the pipette head includes a set of valves, each of which is associated with a pipette location and is connected to an air bleed port, and wherein each of the sets of valves is independently controllable to control the volume of liquid that may be aspirated into each pipette tip. In certain embodiments, each valve is provided in a normally closed position in which full aspiration is provided, and in some embodiments, a position of each valve is timed to movement of the plurality of pistons. In further embodiments, the multichannel air displacement system includes a plurality of gears that are driven by a displacement motor and move the plurality of pistons, and the displacement motor is driven by displacement motor commands. In further embodiments, the displacement motor is mounted on a piston drive plate.

Those skilled in the art will appreciate that numerous modifications and variations may be made to the above disclosed embodiments without departing from the spirit and scope of the present invention.

What is claimed is:

1. A pipetting system, comprising a pipette head including (i) a multichannel air displacement system that includes a plurality of pistons in respective cylinders configured to simultaneously aspirate liquids into a plurality of pipette tips, (ii) a plurality of air bleed ports, and (iii) a plurality of valves, wherein:
   each of the cylinders is configured with an air bleed port;
   each of the valves is connected to an air bleed port; and
   each of the valves is independently controllable to control the volume of liquid that may be aspirated into each pipette tip.

2. The pipetting system as claimed in claim 1, wherein each valve is provided in a normally closed position in which full aspiration is provided.

3. The pipetting system as claimed in claim 1, wherein a position of each valve is timed to movement of the plurality of pistons.

4. The pipetting system as claimed in claim 1, wherein the multichannel air displacement system includes a plurality of gears that are driven by a displacement motor and move the plurality of pistons.

5. The pipetting system as claimed in claim 4, wherein the displacement motor is driven by displacement motor commands.

6. The pipetting system as claimed in claim 4, wherein the displacement motor is mounted on a piston drive plate.

7. A pipetting system, comprising:
a pipette head comprising a multichannel air displacement system configured to aspirate and dispense liquids, wherein the multichannel air displacement system comprises pistons in respective cylinders, a displacement motor configured to reciprocally move the pistons in the respective cylinders in response to displacement motor commands, and a plurality of gears driven by the displacement motor;
a base tower in connection with a base, wherein the pipetting system base tower comprises a linear guide system to which the pipette head is connected;
a counterbalance mechanism in connection with the pipette head; and
a control system configured to transmit the displacement motor commands.

8. The pipetting system of claim 7, wherein the displacement motor and the plurality of gears are mounted on a piston drive plate.

9. The pipetting system of claim 8, wherein the plurality of gears comprises a motor gear, a first set of idler gears, a first set of nut drive gears, a second set of idler gears and a second set of nut drive gears, wherein:
the motor gear is connected to the displacement motor and the first set of idler gears,
the first set of idler gears is connected to the first set of nut drive gears,
the first set of nut drive gears is connected to a coaxial positioning nut,
the first set of nut drive gears and the positioning nut rotate together,
the second set of idler gears is connected to the first set of nut drive gears, and
the second set of idler gears is connected to the second set of nut drive gears.

10. The pipetting system of claim 7, wherein the counterbalance mechanism comprises a counterbalance spring configured to counterbalance at least a portion of a weight of the pipette head.

11. The pipetting system of claim 10, comprising a pipette tip adapter, wherein the pipette tip adapter comprises:
a set of sealing tubes associated with the pipette head; and
an array of pipette tips, wherein each of the pipette tips in the array is associated with a sealing tube in the adapter.

12. The pipetting system of claim 7, wherein the pipette head is configured to move vertically along the linear guide system with respect to the base tower.

13. A pipetting system, comprising:
a pipette head including a multichannel air displacement system configured to aspirate and dispense liquids, wherein the multichannel air displacement system comprises pistons in respective cylinders and a displacement motor configured to reciprocally move the pistons in the respective cylinders in response to displacement motor commands;
a pipetting system base tower in connection with a base, wherein the pipetting system base tower includes a linear guide system to which the pipette head is connected;
a counterbalance mechanism in connection with the pipette head;
a linear actuator motor system configured to move a repositionable shaft as an adjustable stop in response to linear actuator motor commands; and
a control system capable of transmitting the linear actuator motor commands and the displacement motor commands.

14. The pipetting system of claim 13, wherein the linear actuator motor system is configured to advance the repositionable shaft as an adjustable stop for downward travel of the pipette head by interaction of an end of the repositionable shaft with a fixed stop.

15. The pipetting system of claim 14, wherein the fixed stop is connected to the base and the linear actuator motor system is connected to the pipette head.

16. The pipetting system of claim 14, wherein the fixed stop is connected to the pipette head and the linear actuator motor system is connected to the base.

17. The pipetting system of claim 13, comprising a sensor.

18. The pipetting system of claim 17, wherein the sensor senses upward movement of the pipette head when the repositionable shaft is advanced by the linear actuator motor system and contacts the fixed stop.

19. The pipetting system of claim 13, wherein the counterbalance mechanism comprises a counterbalance spring configured to counterbalance at least a portion of a weight of the pipette head.

20. The pipetting system of claim 19, comprising a pipette tip adapter, wherein the pipette tip adapter comprises:
a set of sealing tubes associated with the pipette head; and
an array of pipette tips, wherein each of the pipette tips in the array is associated with a sealing tube in the adapter.

21. The pipetting system of claim 13, wherein the pipette head is configured to move vertically along the linear guide system with respect to the base tower.

* * * * *

UNITED STATES PATENT AND TRADEMARK OFFICE
CERTIFICATE OF CORRECTION

PATENT NO. : 10,821,434 B2
APPLICATION NO. : 15/527419
DATED : November 3, 2020
INVENTOR(S) : Richard Cote Page 1 of 1

It is certified that error appears in the above-identified patent and that said Letters Patent is hereby corrected as shown below:

In the Specification (Column 1, Lines 9-10):
After "are" delete "the disclosure of which is".

(Column 1, Lines 10-11):
After "in" delete "its entirety".

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*